United States Patent
Yasumura

(10) Patent No.: US 7,388,762 B2
(45) Date of Patent: Jun. 17, 2008

(54) SWITCHING POWER SUPPLY CIRCUIT

(75) Inventor: Masayuki Yasumura, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 11/705,820

(22) Filed: Feb. 13, 2007

(65) Prior Publication Data

US 2007/0201251 A1    Aug. 30, 2007

(30) Foreign Application Priority Data

Feb. 15, 2006  (JP)  ............................ P2006-037942
Feb. 17, 2006  (JP)  ............................ P2006-040986

(51) Int. Cl.
*H02M 3/335*   (2006.01)
(52) U.S. Cl. ..................... 363/21.02; 363/97
(58) Field of Classification Search .................. 363/15, 363/20, 21.1, 21.02, 21.03, 95, 97
See application file for complete search history.

(56) References Cited

U.S. PATENT DOCUMENTS 7,158,389 B2 *  1/2007  Yasumura ..................... 363/17
7,209,369 B1 *  4/2007  Yasumura ..................... 363/16
7,242,595 B2 *  7/2007  Yasumura ................. 363/21.02
7,301,785 B2 * 11/2007  Yasumura ................. 363/21.02

FOREIGN PATENT DOCUMENTS

JP         2000-134925 A     5/2000

* cited by examiner

*Primary Examiner*—Adolf Berhane
(74) *Attorney, Agent, or Firm*—Lerner, David, Littenberg, Krumholz & Mentlik, LLP

(57) ABSTRACT

The present invention may provide a switching power supply circuit for converting primary side direct-current voltage to secondary side direct-current voltage. The switching power supply circuit may include a choke coil, a converter transformer; a switching element, a primary side series resonant capacitor, a primary side parallel resonant capacitor, an oscillating and driving circuit, a secondary side rectifier circuit, and a control circuit. Resonance frequency of the primary side first series resonant circuit may be set at a frequency substantially twice resonance frequency of the primary side second series resonant circuit. Resonance frequency of the primary side parallel resonant circuit may be set at a frequency substantially equal to or higher than 1.5 times the resonance frequency of the primary side first series resonant circuit.

9 Claims, 26 Drawing Sheets

SWITCHING POWER SUPPLY CIRCUIT

CROSS-REFERENCE TO RELATED APPLICATIONS

The present application claims priority from Japanese Patent Application No. JP 2006-037942 filed in the Japanese Patent Office on Feb. 15, 2006 and JP 2006-040986 filed in the Japanese Patent Office on Feb. 17, 2006, the disclosures of which are hereby incorporated by reference herein.

BACKGROUND OF THE INVENTION

1. Field of the Invention

The present invention relates to a switching power supply circuit.

2. Description of the Related Art

As so-called soft-switching power supply of a resonant type, a voltage resonant converter formed by a single-ended system with one switching element as in Japanese Patent Laid-Open No. 2000-134925, for example, is known.

FIG. 22 shows one example of configuration of a switching power supply circuit including a voltage resonant converter formed by such a single-ended system.

The switching power supply circuit shown in FIG. 22 rectifies and smoothes an alternating voltage VAC from a commercial alternating-current power supply AC by a rectifying and smoothing circuit composed of a bridge rectifier circuit Di and a smoothing capacitor Ci, and thereby generates a rectified and smoothed voltage Ei as voltage across the smoothing capacitor Ci. Incidentally, a noise filter, which is composed of one set of common mode choke coils CMC and two across capacitors CL, for eliminating common mode noise is provided in the line of the commercial alternating-current power supply AC.

This rectified and smoothed voltage Ei is input as direct-current input voltage to the voltage resonant converter. This voltage resonant converter has a configuration of a single-ended system having one switching element Q1. The voltage resonant converter in this case is externally excited, and thus a MOS-FET as the switching element Q1 is switching-driven by an oscillating and driving circuit 2.

A body diode DD of the MOS-FET is connected in parallel with the switching element Q1. In addition, a primary side parallel resonant capacitor Cr is connected in parallel with the drain and source of the switching element Q1.

A primary side parallel resonant circuit (voltage resonant circuit) whose resonance frequency is governed by the primary side parallel resonant capacitor Cr and a leakage inductance L1 produced by the primary winding N1 of a converter transformer PIT is formed. A voltage resonant operation as switching operation of the switching element Q1 is obtained by the primary side parallel resonant circuit. The resonance frequency is determined mainly by the leakage inductance L1 of the primary winding N1 and the capacitance of the primary side parallel resonant capacitor Cr.

The oscillating and driving circuit 2 applies a gate voltage as a drive signal to the gate of the switching element Q1 to switching-drive the switching element Q1. Thereby the switching element Q1 performs switching operation at a switching frequency corresponding to the cycle of the drive signal.

The converter transformer PIT transmits the switching output of the switching element Q1 to a secondary side. The structure of the converter transformer PIT has for example an EE-shaped core formed by combining E-shaped cores of ferrite material with each other. A winding part is divided between the primary winding N1 and a secondary winding N2, and the primary winding N1 and the secondary winding N2 are wound on a bobbin around a central magnetic leg of the EE-shaped core. Also, a gap of 0.8 mm to 1 mm, for example, is formed in the central magnetic leg of the EE-shaped core of the converter transformer PIT. Thereby k=about 0.80 to 0.85 is obtained as the value of a coupling coefficient k between the primary side and the secondary side. The coupling coefficient k at this level represents a degree of coupling that may be considered to be loose coupling. Lowering the value of the coupling coefficient k makes the converter transformer saturated less easily. In addition, the leakage inductance L1 is produced in the primary winding N1 on a condition that the value of the coupling coefficient k is lower than one.

One end of the primary winding N1 of the converter transformer PIT is inserted between the switching device Q1 and the positive electrode terminal of the smoothing capacitor Ci. Thereby, the switching output of the switching device Q1 is transmitted to the primary winding N1. An alternating voltage induced by the primary winding N1 occurs in the secondary winding N2 of the converter transformer PIT.

In this case, a secondary side series resonant capacitor C5 is connected in series with one end of the secondary winding N2. Thereby a secondary side series resonant circuit (current resonant circuit) whose resonance frequency is governed by the leakage inductance L2 of the secondary winding N2 and the capacitance of the secondary side series resonant capacitor C5 is formed. The resonance frequency is determined mainly by the leakage inductance L2 of the secondary winding N2 and the capacitance of the secondary side series resonant capacitor C5.

In addition, rectifier diodes Do1 and Do2 and a smoothing capacitor Co are connected to the secondary side series resonant circuit as shown in FIG. 22, whereby a voltage doubler half-wave rectifier circuit is formed. This voltage doubler half-wave rectifier circuit generates a secondary side direct-current output voltage Eo having a level corresponding to twice an alternating voltage V22 induced in the secondary winding N2 as voltage across the smoothing capacitor Co. The secondary side direct-current output voltage Eo is supplied to a load, and is input to a control circuit 1 as detection voltage for constant-voltage control.

The control circuit 1 inputs a detection output obtained by detecting the level of the secondary side direct-current output voltage Eo input as detection voltage to the oscillating and driving circuit 2. The oscillating and driving circuit 2 outputs a drive signal varied in frequency and the like according to the level of the secondary side direct-current output voltage Eo which level is indicated by the detection output input to the oscillating and driving circuit 2. The oscillating and driving circuit 2 thereby controls the switching operation of the switching element Q1 so as to make the secondary side direct-current output voltage Eo constant at a predetermined level. Thereby control for stabilizing the secondary side direct-current output voltage Eo is performed.

FIGS. 23A, 23B, and 23C and FIG. 24 show results of experiments on the power supply circuit having the configuration shown in FIG. 22 described above. Incidentally, in the experiments that provided the results of FIGS. 23A, 23B, and 23C and FIG. 24, principal parts of the power supply circuit of FIG. 22 is set as follows.

For the converter transformer PIT, an EER-35 is selected as a core material, and the gap of the central magnetic leg is set to a gap length of 1 mm. As for the numbers T of turns of the primary winding N1 and the secondary winding N2, N1=39 T and N2=23 T, respectively. The level of a voltage induced per turn (T) of the secondary winding N2 is set to 3 V/T. The coupling coefficient k of the converter transformer PIT is set to k=0.81.

The capacitance of the primary side parallel resonant capacitor Cr is selected to be Cr=3900 pF, and the capacitance of the secondary side series resonant capacitor C5 is selected to be C5=0.1 µF. Accordingly, the primary side parallel resonance frequency $fo_1p$ of the primary side parallel resonant circuit is set at 230 kHz, and the secondary side series resonance frequency $fo_2s$ of the secondary side series resonant circuit is set to 82 kHz. In this case, relative relation between the primary side parallel resonance frequency $fo_1p$ and the secondary side series resonance frequency $fo_2s$ is expressed by $fo_1p \approx 2.6 \times fo_2s$.

The rated level of the secondary side direct-current output voltage Eo is 135 V. Load power is supplied in a range of maximum load power Pomax=200 W to minimum load power Pomin=0 W.

FIGS. 23A, 23B, and 23C are waveform charts showing operations of principal parts in the power supply circuit shown in FIG. 22 on the basis of switching cycles of the switching element Q1. FIG. 23A shows a voltage V1, a switching current IQ1, a primary winding current I21, a secondary winding current I22, and secondary side rectified currents ID1 and ID2 when the maximum load power Pomax=200 W. FIG. 23B shows the voltage V1, the switching current IQ1, the primary winding current I21, and the secondary winding current I22 when medium load power Po=120 W. FIG. 23C shows the voltage V1 and the switching current IQ1 when the minimum load power Pomin=0 W.

The voltage V1 is obtained across the switching device Q1. The voltage V1 is at a zero level in a period TON in which the switching device Q1 is on, and forms a sinusoidal resonant pulse in a period TOFF in which the switching device Q1 is off. The resonant pulse waveform of the voltage V1 indicates that the operation of the primary side switching converter is voltage resonant operation.

The switching current IQ1 flows through the switching device Q1 and the body diode DD. The switching current IQ1 flows with waveforms shown in the figures during the period TON, and is at a zero level during the period TOFF. The primary winding current I21 flowing through the primary winding N1 is obtained by combining a current component flowing as the switching current IQ1 during the period TON with a current flowing through the primary side parallel resonant capacitor Cr during the period TOFF.

The rectified currents ID1 and ID2 shown in FIG. 23A flowing through the rectifier diodes Do1 and Do2 forming a secondary side rectifier circuit, each flows sinusoidally, as shown in the figure. In this case, the resonant operation of the secondary side series resonant circuit appears in the waveform of the rectified current ID1 more dominantly than in the rectified current ID2.

The secondary winding current I22 flowing through the secondary winding N2 has a waveform obtained by combining the rectified currents ID1 and ID2 with each other.

FIG. 24 shows switching frequency fs, the on period TON and the off period TOFF of the switching element Q1, and AC-to-DC power conversion efficiency ($\eta AC \rightarrow DC$) of the power supply circuit shown in FIG. 22 with respect to load variation.

First, looking at the AC-to-DC power conversion efficiency ($\eta AC \rightarrow DC$), high efficiencies of 90% or more are obtained over a wide range of load power Po=50 W to 200 W. The inventor of the present application has previously confirmed by experiment that such a characteristic is obtained when a secondary side series resonant circuit is combined with a voltage resonant converter of a single-ended type.

The switching frequency fs, the on period TON, and the off period TOFF in FIG. 24 indicate the switching operation of the power supply circuit shown in FIG. 22 as a characteristic of constant-voltage control dealing with load variation. In this case, the switching frequency fs is substantially constant with respect to load variation. On the other hand, the on period TON and the off period TOFF linearly change in manners opposite to each other as shown in FIG. 24. This indicates that the switching operation is controlled by holding the switching frequency substantially constant while the secondary side direct-current output voltage Eo is varied, and changing a time ratio between the on period and the off period. Such control can be regarded as PWM (Pulse Width Modulation) control that changes the on period and the off period within one cycle. The power supply circuit shown in FIG. 22 stabilizes the secondary side direct-current output voltage Eo by this PWM control.

FIG. 25 schematically shows the constant-voltage control characteristic of the power supply circuit shown in FIG. 22 by relation between the switching frequency fs (kHz) and the secondary side direct-current output voltage Eo. The power supply circuit shown in FIG. 22 has the primary side parallel resonant circuit and the secondary side series resonant circuit. Therefore the power supply circuit shown in FIG. 22 has, in a composite manner, two resonant impedance characteristics, that is, a resonant impedance characteristic corresponding to the primary side parallel resonance frequency $fo_1p$ of the primary side parallel resonant circuit and the secondary side series resonance frequency $fo_2s$ of the secondary side series resonant circuit. Since the power supply circuit shown in FIG. 22 has the relation $fo_1p \approx 2.8 \times fo_2s$, the secondary side series resonance frequency $fo_2s$ is lower than the primary side parallel resonance frequency $fo_1p$, as shown in FIG. 25.

As for constant-voltage control characteristics with respect to the switching frequency fs under a condition of a constant alternating input voltage VAC, as shown in FIG. 25, constant-voltage control characteristics at the maximum load power Pomax and the minimum load power Pomin under the resonant impedance corresponding to the primary side parallel resonance frequency $fo_1p$ of the primary side parallel resonant circuit are represented by characteristic curves A and B, respectively, and constant-voltage control characteristics at the maximum load power Pomax and the minimum load power Pomin under the resonant impedance corresponding to the secondary side series resonance frequency $fo_2s$ of the secondary side series resonant circuit are represented by characteristic curves C and D, respectively. When constant-voltage control is to be performed at tg, which is a rated level of the secondary side direct-current output voltage Eo, under the characteristics shown in FIG. 25, the variable range (necessary control range) of the switching frequency fs necessary for the constant-voltage control can be represented as a section denoted by Δfs.

The variable range Δfs shown in FIG. 25 as a necessary frequency control range extends from the characteristic curve C, which corresponds to the secondary side series resonance frequency $fo_2s$ of the secondary side series resonant circuit at the maximum load power Pomax, to the characteristic curve B, which corresponds to the primary side parallel resonance frequency $fo_1p$ of the primary side parallel resonant circuit, at the minimum load power Pomin.

Crossed between the characteristic curve C at the maximum load power Pomax and the characteristic curve B at the minimum load power Pomin are the characteristic curve D, which corresponds to the secondary side series resonance frequency $fo_2s$ of the secondary side series resonant circuit, at the minimum load power Pomin and the characteristic curve A, which corresponds to the primary side parallel resonance frequency $fo_1p$ of the primary side parallel resonant circuit, at the maximum load power Pomax. Thus, as the constant-voltage control operation of the power supply circuit shown in FIG. 22, switching-driving control is performed by PWM control that holds the switching frequency fs substantially fixed, and which changes the time ratio between the periods TON and TOFF in one switching period. Incidentally, this is indicated by the fact that the period length of one switching period (TOFF+TON) shown at the times of the maximum load power Pomax=200 W, load power=100 W, and the minimum load power Pomin=0 W in FIGS. 23A, 23B, and 23C is substantially constant, while the widths of the period TOFF and the period TON are changed.

Such an operation is obtained by making a transition between a state in which the resonant impedance (capacitive impedance) at the primary side parallel resonance frequency $fo_1p$ of the primary side parallel resonant circuit is dominant and a state in which the resonant impedance (inductive impedance) at the secondary side series resonance frequency $fo_2s$ of the secondary side series resonant circuit is dominant, as resonant impedance characteristics according to load variation in the power supply circuit, in the narrow variable range (Δfs) of the switching frequency.

The power supply circuit shown in FIG. 22 has the following problems. The switching current IQ1 at the maximum load power Pomax shown in FIG. 23A among the waveform charts of FIGS. 23A, 23B, and 23C described above is at a zero level until an end of the off period TOFF as turn-on timing. When the on period TON arrives, the switching current IQ1 operates such that the switching current IQ1 first flows as a current of negative polarity through the body diode DD1 and is then inverted to flow between the drain and the source of the switching element Q1. Such an operation indicates that ZVS (Zero Voltage Switching) is performed properly.

On the other hand, the switching current IQ1 shown in FIG. 23B when Po=120 W corresponding to a medium load operates so as to flow as noise before the end of the off period TOFF as turn-on timing. This operation is an abnormal operation in which ZVS is not properly performed. That is, it is known that a voltage resonant converter provided with a secondary side series resonant circuit as shown in FIG. 22 causes the abnormal operation in which ZVS is not properly performed at the time of the medium load. It is confirmed that an actual power supply circuit as shown in FIG. 22 causes such an abnormal operation in a load variation range as the section A shown in FIG. 24, for example.

As described earlier, a voltage resonant converter provided with a secondary side series resonant circuit inherently has, as a tendency thereof, a characteristic of being able to maintain high efficiency in an excellent manner as the load is varied. However, as shown by the switching current IQ1 in FIG. 23B, a considerable peak current flows at the time of turning on the switching element Q1, thereby inviting an increase in switching loss and constituting a factor in lowering power conversion efficiency. At any rate, the abnormal operation as described above causes a shift in phase-gain characteristics of a constant-voltage control circuit system, for example, thus resulting in a switching operation in a state of abnormal oscillation. Thus, in the present situation, there is a strong recognition that it is difficult to put the power supply circuit of FIG. 22 to practical use in actuality.

In order to remedy this, a so-called class E switching converter shown in FIG. 26 has been put to practical use as a converter combining a voltage resonant converter and a current resonant converter. The class E switching converter shown in FIG. 26 has a switching element Q1. The switching element Q1 in this case is a MOS-FET. A body diode DD is formed so as to be connected in parallel with the drain and source of the switching element Q1 as MOS-FET. A forward direction of the body diode DD in this case is from the source to the drain.

A primary side parallel resonant capacitor Cr is connected in parallel with the drain and source of the same switching element Q1. The drain of the switching element Q1 is connected to the positive electrode terminal of a direct-current input voltage Ein via a series connection of a choke coil L10. The source of the switching element Q1 is connected to the negative electrode terminal of the direct-current input voltage Ein.

One terminal of a choke coil L11 is connected to the drain of the switching element Q1, and a series resonant capacitor C11 is connected in series with another terminal of the choke coil L11. An impedance Z as a load is inserted between the series resonant capacitor C11 and the negative electrode terminal of the direct-current input voltage Ein. Concrete examples of the impedance Z include a piezoelectric transformer, a fluorescent lamp ready for high frequencies, and the like.

Incidentally, since the inductance of the choke coil L10 is set considerably higher than the inductance of the choke coil L11, the class E switching converter of such a configuration can be considered one form of a complex resonant converter including a parallel resonant circuit formed by the inductance of the choke coil L10 and the capacitance of the primary side parallel resonant capacitor Cr and a series resonant circuit formed by the inductance of the choke coil L11 and the capacitance of the series resonant capacitor C11. In addition, the class E switching converter can be said to be the same as a voltage resonant converter of a single-ended type in that the class E switching converter is formed with only one switching element.

FIG. 27 shows operations of principal parts of the class E switching converter having the configuration shown in FIG. 26 described above. A switching voltage V1 is obtained across the switching element Q1. The switching voltage V1 is at a zero level during a period TON during which the switching element Q1 is on, and has a sinusoidal pulse waveform during a period TOFF during which the switching element Q1 is off. This switching pulse waveform is obtained as a result of the resonant operation (voltage resonant operation) of the above-described parallel resonant circuit.

A switching current IQ1 flows through the switching element Q1 and the body diode DD. The switching current IQ1 is at a zero level during the period TOFF. In the period TON, the switching current IQ1 first flows through the body diode DD and is thus of negative polarity for a certain period from a starting time point of the period TON, and is thereafter inverted to be of positive polarity and flows from the drain to the source of the switching element Q1.

A current I2 flowing through a transformer of the class E switching converter is obtained by combining the switching current IQ1 flowing through the switching element Q1 (and the body diode DD) with a current flowing through the primary side parallel resonant capacitor Cr. The current I2 has a waveform including a sinusoidal wave component.

Relation between the switching current IQ1 and the switching voltage V1 described above indicates that the operation of a ZVS characteristic is obtained in turn-off timing of the switching element Q1 and that the operation of the ZVS characteristic and a ZCS (Zero Current Switching) characteristic is obtained in turn-on timing.

A current I1 flowing from the positive electrode terminal of the direct-current input voltage Ei through the choke coil L10 into the class E switching converter forms a pulsating current waveform having a predetermined average level as shown in FIG. 27 with a relation of L10>L11 set for the inductances of the choke coils L10 and L11. Such a pulsating current waveform can be considered approximate to a direct current.

SUMMARY OF THE INVENTION

With the above-described class E converter, abnormal operation does not occur in a section of specific load power, and the ZVS characteristic can be obtained over a wide range of load power. However, the choke coil L10 in the class E converter has a high value of 1 mH, for example. Thus, when the switching power supply circuit is formed by the above configuration, device size and price are increased.

It is accordingly desirable to provide a switching power supply circuit that has the ZVS characteristic and makes it possible to decrease the size of an inductor used in the device.

Accordingly, in view of the above-described problems, a switching power supply circuit according to an embodiment of the present invention may be formed as follows.

The switching power supply circuit for converting primary side direct-current voltage to secondary side direct-current voltage may include on a primary side: a choke coil supplied with the primary side direct-current voltage; a converter transformer having a primary winding, which is connected to the choke coil, on the primary side, and a secondary winding on a secondary side; a switching element for switching the primary side direct-current voltage supplied via the choke coil and the primary winding of the converter transformer; a primary side series resonant capacitor having one terminal connected to a point of connection between the choke coil and the primary winding, the primary side series resonant capacitor forming a primary side first series resonant circuit with an inductance of the choke coil and forming a primary side second series resonant circuit with a leakage inductance occurring at the primary winding; a primary side parallel resonant capacitor connected in parallel with the switching element, the primary side parallel resonant capacitor forming a primary side parallel resonant circuit with the inductance of the choke coil and the leakage inductance occurring at the primary winding; and an oscillating and driving circuit for on-off driving of the switching element.

The switching power supply circuit may include on the secondary side: a secondary side rectifier circuit for generating the secondary side direct-current voltage, the secondary side rectifier circuit being connected to the secondary winding of the converter transformer, a switching output of the switching element being transmitted to the secondary winding of the converter transformer; and a control circuit for supplying a control signal to make a value of the secondary side direct-current voltage output by the secondary side rectifier circuit a predetermined value to the oscillating and driving circuit.

In this switching power supply circuit, resonance frequency of the primary side first series resonant circuit may be set at a frequency substantially twice resonance frequency of the primary side second series resonant circuit, and resonance frequency of the primary side parallel resonant circuit is set at a frequency substantially equal to or higher than 1.5 times the resonance frequency of the primary side first series resonant circuit, whereby the primary side of the switching power supply circuit has the ZVS characteristic over a wide range of load variation.

The switching power supply circuit may further include an active clamping circuit for clamping a voltage applied to the switching element, the active clamping circuit being connected in parallel with a series circuit of the choke coil and the primary winding of the converter transformer, the active clamping circuit being formed by connecting an auxiliary switching element, which is turned on complementarily to the switching element, and a voltage clamping capacitor in series with each other.

The auxiliary switching element and the switching element may be turned on complementarily to each other. The auxiliary switching element and the switching element being turned on complementarily to each other means that the two switching elements are not simultaneously turned on. Since the voltage applied to the switching element may be clamped by turning on the auxiliary switch, the withstand voltage of the switching element can be lowered.

Thus, according to an embodiment of the present invention, it is possible to provide a switching power supply circuit that has the ZVS characteristic and makes it possible to decrease the size of an inductor used in the device.

DETAILED DESCRIPTION

Figure 1:
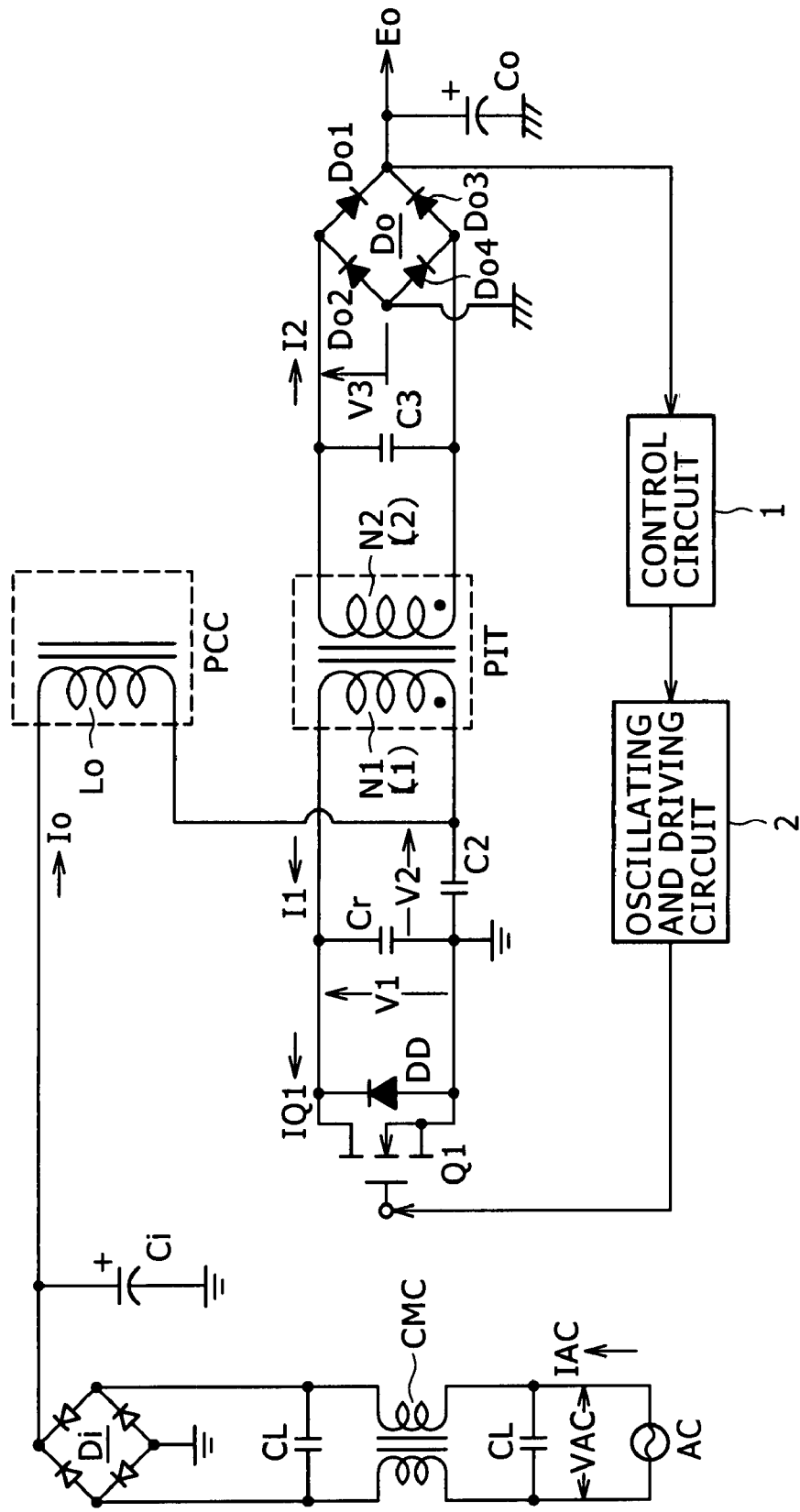
FIG. 1 is a circuit diagram showing an example of configuration of a power supply circuit according to a first embodiment.

A switching power supply circuit according to a present embodiment converts direct-current power into alternating-current power, and then further converts the alternating-current power into secondary side direct-current power. The switching power supply circuit includes: a choke coil supplied with the direct-current power; a converter transformer having a primary side primary winding supplied with power from the choke coil and a secondary side secondary winding; a primary side series resonant capacitor and a primary side parallel resonant capacitor for forming primary side resonant circuits; a switching element for supplying the alternating-current power to the primary winding; a oscillating and driving circuit for performing on/off driving of the switching element; and a control circuit for supplying the oscillating and driving circuit with a control signal to set the value of a secondary side direct-current output voltage output by a secondary side rectifier circuit connected to the secondary winding to a predetermined value.

A resonant circuit formed on the primary side has a voltage and current resonant switching circuit formed by combining a voltage resonant circuit and a primary side first series resonant circuit and a primary side second series resonant circuit as two current resonant circuit sets with each other (a circuit having such a circuit configuration and performing ZVS operation will hereinafter be referred to as a class I switching circuit). The secondary side has various configurations such as a full-wave rectifier circuit, a double-wave rectifier circuit, a half-wave rectifier circuit, a voltage doubler rectifier circuit, a partial voltage resonant circuit, a parallel resonant circuit, a series resonant circuit, or the like.

On the basis of findings from results of experiments by an inventor listed in the present application (hereinafter abbreviated to the inventor of the present application), the frequencies of the respective resonant circuits on the primary side are set as follows to maintain ZVS characteristics. The resonance frequency of the primary side parallel resonant circuit governed by the inductance of the choke coil, the leakage inductance of the primary winding, and the primary side parallel resonant capacitor, is set higher than a primary side first series resonance frequency governed by the inductance of the choke coil and the primary side series resonant capacitor. Further, the resonance frequency of the primary side first series resonant circuit is set higher than the resonance frequency of the primary side second series resonant circuit. The frequency of the primary side second series resonant circuit is governed by the leakage inductance of the primary winding and the primary side series resonant capacitor.

Further, from results of experiments by the inventor of the present application, especially when load power varies over a wide range, each of the resonance frequencies where excellent ZVS characteristics are obtained is more preferably set in the following range. The resonance frequency of the primary side first series resonant circuit is set to substantially twice the resonance frequency of the primary side second series resonant circuit, and the resonance frequency of the primary side parallel resonant circuit is set substantially equal to or higher than 1.5 times the primary side first series resonance frequency. Substantially twice the resonance frequency includes a range having a spread of about 30 percent with twice the resonance frequency as a central value. The wider the range of the spread from the central value, the narrower a load power variation range where ZVS characteristics are exhibited. The narrower the range of the spread from the central value, the wider the load power variation range where ZVS characteristics are exhibited. Similarly, a value substantially equal to or higher than 1.5 times the resonance frequency includes a range having a spread of about 30 percent. The higher the value, the narrower the load power variation range where ZVS characteristics are exhibited. The lower the value, the narrower the load power variation range where ZVS characteristics are exhibited. However, when this value becomes equal to or higher than twice the resonance frequency, the range where ZVS characteristics are exhibited is widened, but the effect itself of the ZVS characteristics is reduced. Therefore a range of about 30 percent is desirable.

The switching power supply circuit according to the present embodiment has such a configuration, and can thus provide a switching power supply circuit that is free from error operation in a specific range of load power and which makes it possible to reduce the size of an inductor of the choke coil used in the device. Description will be made below in more detail by citing concrete examples.

First Embodiment

FIG. 1 shows a switching power supply circuit according to a first embodiment. On a primary side, this switching power supply circuit has a primary side parallel resonant circuit, a primary side first series resonant circuit, and a primary side second series resonant circuit. The primary side parallel resonant circuit is a voltage resonance type whose resonance frequency is governed by the inductance Lo of a choke coil PCC, a leakage inductance L1 occurring at a primary winding N1, and a primary side parallel resonant capacitor Cr. The primary side first series resonant circuit is a current resonance type whose resonance frequency is governed by the inductance Lo and a primary side series resonant capacitor C2. The primary side second series resonant circuit is a current resonance type whose resonance frequency is governed by the leakage inductance L1 and the primary side series resonant capacitor C2. On a secondary side, the switching power supply circuit has a partial voltage resonant circuit formed by connecting a secondary side partial voltage resonant capacitor C3 to a secondary winding N2 and a full-wave bridge rectifier circuit having a secondary side rectifying element Do composed of diodes D1 to D4 and a smoothing capacitor Co for obtaining a secondary side direct-current output voltage Eo. The switching power supply circuit as a whole forms a multiple resonant converter.

A primary side first series resonance frequency as resonance frequency of the primary side first series resonant circuit is set to be substantially twice a primary side second series resonance frequency as resonance frequency of the primary side second series resonant circuit. A primary side parallel resonance frequency as resonance frequency of the primary side parallel resonant circuit is set to be substantially equal to or higher than 1.5 times the primary side first series resonance frequency. The partial voltage resonant circuit on the secondary side makes a resonance current flow only for a short time immediately after the secondary side rectifying element Do is inverted to be on or off.

In the switching power supply circuit shown in FIG. 1, one set of common mode choke coils CMC and two across capacitors CL are inserted in a line of a commercial alternating-current power supply AC as shown in the figure. The common mode choke coils CMC and the across capacitors CL form a noise filter for eliminating common mode noise superimposed on the line of the commercial alternating-current power supply AC.

An alternating input voltage VAC is rectified by a bridge rectifier circuit Di, and a smoothing capacitor Ci is charged with the rectified output. That is, a rectifying and smoothing circuit formed by the bridge rectifier circuit Di and the smoothing capacitor Ci rectifies and smoothes commercial alternating-current power. Thereby a rectified and smoothed voltage Ei is obtained as voltage across the smoothing capacitor Ci. This rectified and smoothed voltage Ei is a direct-current input voltage for a switching converter in a subsequent stage.

The switching converter that is supplied with the above-described rectified and smoothed voltage Ei as direct-current input voltage and performs switching operation is formed as a class I switching circuit, which is a modification of a class E switching converter shown in the background art. A high withstand voltage MOS-FET is selected as a switching element Q1 in this case. A driving system for driving the class I switching circuit in this case is an externally exciting system that switching-drives the switching element by an oscillating and driving circuit 2.

The drain of the switching element Q1 is connected to the positive electrode terminal of the smoothing capacitor Ci via a series connection of the primary winding N1 of a converter transformer PIT and the choke coil PCC. The source of the switching element Q1 is connected to a primary side ground. A switching driving signal output from the oscillating and driving circuit 2 is applied to the gate of the switching element Q1.

Since a MOS-FET is selected as the switching element Q1 in this case, the switching element Q1 includes a body diode DD connected in parallel with the source and the drain of the switching element Q1 as shown in FIG. 1. The body diode DD has an anode connected to the source of the switching element Q1 and a cathode connected to the drain of the switching element Q1. This body diode DD forms a path for passing a switching current in an opposite direction. The current is generated by on/off operation (that is, switching operation) of the switching element Q1.

The primary side parallel resonant capacitor Cr is connected in parallel with the drain and the source of the switching element Q1. A primary side parallel resonant circuit is formed which has resonance frequency governed by the capacitance of the primary side parallel resonant capacitor Cr, the leakage inductance L1 of the primary winding N1 of the converter transformer PIT, and the inductance Lo of the choke coil PCC. This primary side parallel resonant circuit performs a resonant operation, whereby a voltage resonant operation is obtained as switching operation of the switching element Q1. Accordingly, a sinusoidal resonant pulse waveform is obtained in the off period of the switching element Q1 as end-to-end voltage V1 between the drain and the source of the switching element Q1.

In addition, a series connection circuit of the primary winding N1 of the converter transformer PIT to be described later and the primary side series resonant capacitor C2 is connected in parallel with the switching element Q1. In this case, another terminal of the primary winding N1 is connected to the drain of the switching element Q1, and one terminal of the primary winding N1 is connected to one terminal of the primary side series resonant capacitor C2. A terminal of the primary side series resonant capacitor C2 which terminal is not connected to the primary winding N1 is connected to the source of the switching element Q1 at a potential of the primary side ground. Also, the primary side series resonant capacitor C2 is connected in series with the choke coil PCC via the smoothing capacitor Ci. The primary side first series resonant circuit and the primary side second series resonant circuit are thus obtained.

In order to drive the switching element Q1 by the externally driving system, for example, the oscillating and driving circuit 2 generates a drive signal as a gate voltage for switching driving of the MOS-FET on the basis of an oscillating signal obtained from an oscillating circuit included in the oscillating and driving circuit 2, and applies the drive signal to the gate of the switching element Q1. Thereby the switching element Q1 continually performs on/off operation according to the waveform of the drive signal. That is, the switching element Q1 performs switching operation.

The converter transformer PIT is to transmit the switching output of the primary side switching converter to the secondary side with the primary side and the secondary side insulated from each other in terms of direct current. For this, the primary winding N1 and the secondary winding N2 are wound around a core in a state of being divided from each other.

The structure of the converter transformer PIT in this case has for example an EE-shaped core formed by combining E-shaped cores of ferrite material with each other. A winding part is divided between the primary winding N1 and the secondary winding N2, and the primary winding N1 and the secondary winding N2 are wound around a central magnetic leg of the EE-shaped core. Also, a gap is formed in the central magnetic leg of the EE-shaped core of the converter transformer PIT. Thereby a loose coupling coefficient k is obtained between the primary side and the secondary side. Loose coupling can produce the leakage inductance L1 and a leakage inductance L2, and prevents a magnetic flux from being saturated easily in the EE-shaped core.

The primary winding N1 of the converter transformer PIT thus produces the leakage inductance L1 and is an element for forming the primary side second series resonant circuit and the primary side parallel resonant circuit in the class I switching circuit. Further, an alternating voltage corresponding to the switching output of the switching element Q1 being applied to the primary winding N1, the primary winding N1 has a function of transmitting power to the secondary side with the primary winding N1 coupled with the secondary winding N2 in a state of being insulated therefrom in terms of direct current.

On the secondary side of the converter transformer PIT, an alternating voltage is generated in the secondary winding N2 on the basis of a magnetic flux in the EE-shaped core which flux is induced by the primary winding N1. A secondary side partial voltage resonant capacitor C3 is connected in parallel connection relation to the secondary winding N2. Thus, the leakage inductance L2 of the secondary winding N2 and the capacitance of the secondary side partial voltage resonant capacitor C3 form a secondary side partial resonant circuit. This secondary side partial resonant circuit reduces a power loss occurring immediately after on and off switching of each of the diodes Do1 to Do4 forming the secondary side rectifying element Do. In the first embodiment, the capacitance of the secondary side partial voltage resonant capacitor C3 is 1000 pF (picofarads).

A secondary side rectifier circuit in this case is formed as a full-wave rectifier circuit by connecting the input side of the secondary side rectifying element Do formed by the four diodes Do1 to Do4 to the secondary winding N2 with which the secondary side partial voltage resonant capacitor C3 is connected in parallel, and connecting the output side of the secondary side rectifying element Do to a smoothing capacitor Co. Thereby, as a voltage across the smoothing capacitor Co, a secondary side direct-current output voltage Eo is obtained which has a level corresponding to the level of the alternating voltage induced in the secondary winding N2. The thus generated secondary side direct-current output voltage Eo is supplied to a load. The secondary side direct-current output voltage Eo also branches off to be output as a detection voltage to a control circuit 1.

The control circuit 1 supplies a detection output corresponding to a change in the level of the input secondary side direct-current output voltage Eo to the oscillating and driving circuit 2. The oscillating and driving circuit 2 drives the switching element Q1 so as to vary switching frequency according to the input detection output of the control circuit 1 and, with this, vary a time ratio (conduction angle) between an on-period TON and an off period TOFF in one switching cycle. This operation is constant-voltage control operation on the secondary side direct-current output voltage.

Thus variably controlling the switching frequency and the conduction angle of the switching element Q1 changes the resonant impedances of the primary side and the secondary side in the power supply circuit and a power transmission effective period, and changes an amount of power transmitted from the primary winding N1 to the secondary winding N2 side of the converter transformer PIT and an amount of power to be supplied from the secondary side rectifier circuit to the load. Thereby an operation of controlling the level of the secondary side direct-current output voltage Eo so as to cancel variations in the level of the secondary side direct-current output voltage Eo is obtained. That is, the secondary side direct-current output voltage Eo is stabilized.

As described above, it is generally considered that a power supply circuit having a voltage resonant converter on the primary side is difficult to be put to practical use as it is because the power supply circuit has a narrow load power control range and is difficult to maintain ZVS characteristics under light load.

However, on the basis of numerous experimental results obtained with parameters changed variously, the inventor of the present application has found the following fact: it is possible to provide a converter circuit that can maintain ZVS characteristics for a wide range of values of load power Po by providing the primary side first series resonant circuit, the primary side second series resonant circuit, and the primary side parallel resonant circuit on the primary side, and by setting the frequencies of the three resonant circuits in predetermined relation, that is, setting the resonance frequency of the primary side parallel resonant circuit higher than the primary side first series resonance frequency and setting the resonance frequency of the primary side first series resonant circuit higher than the resonance frequency of the primary side second series resonant circuit. In addition, it is possible to provide a more stable converter circuit that maintains ZVS characteristics for a wider range of values of load power Po by maintaining the resonance frequency of the primary side first series resonant circuit at substantially twice the resonance frequency of the primary side second series resonant circuit and maintaining the resonance frequency of the primary side parallel resonant circuit at a frequency substantially equal to or higher than 1.5 times the primary side first series resonance frequency.

Figure 22:
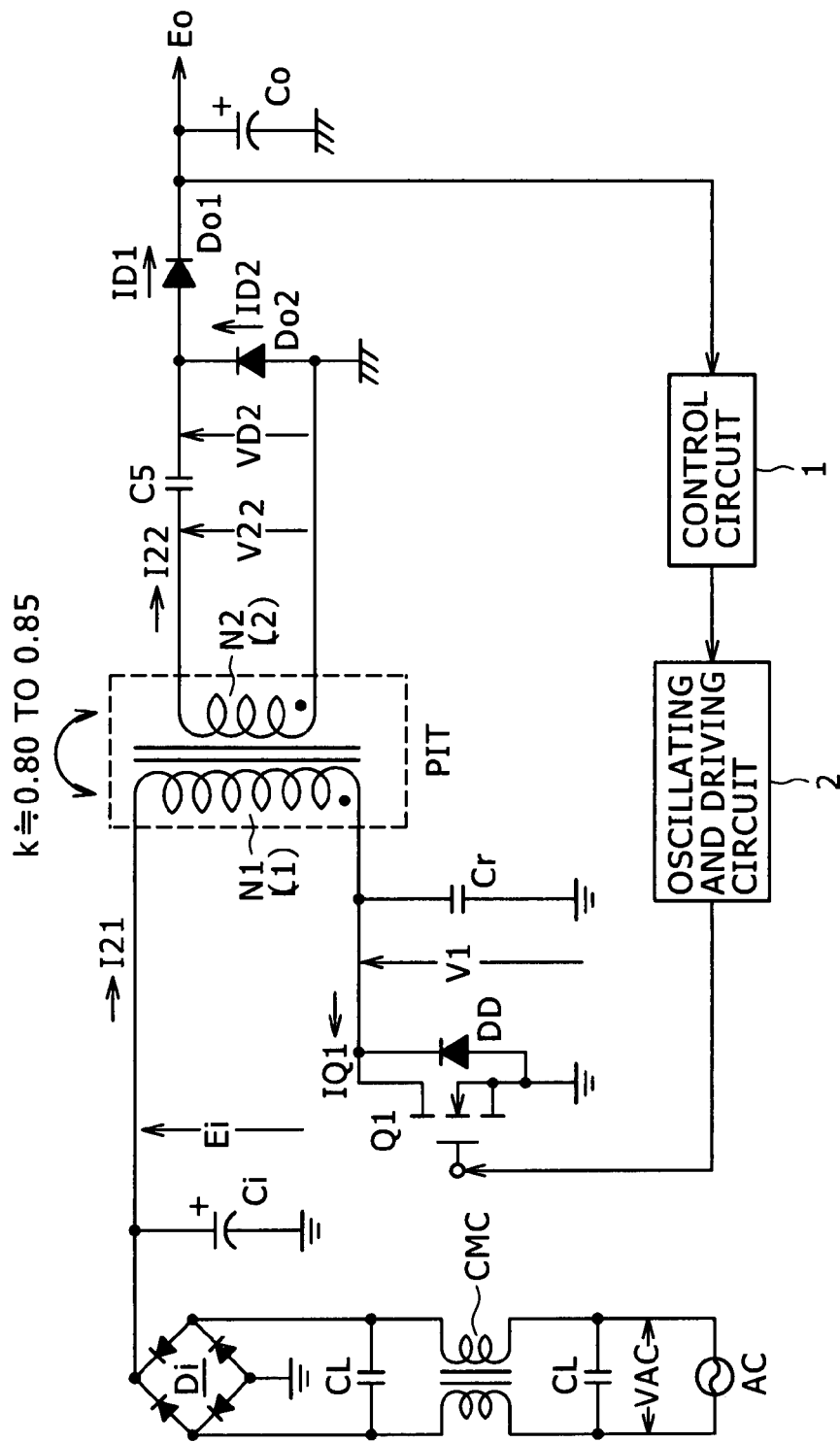
FIG. 22 is a circuit diagram showing an example of configuration of a power supply circuit according to the background art.
Figure 26:
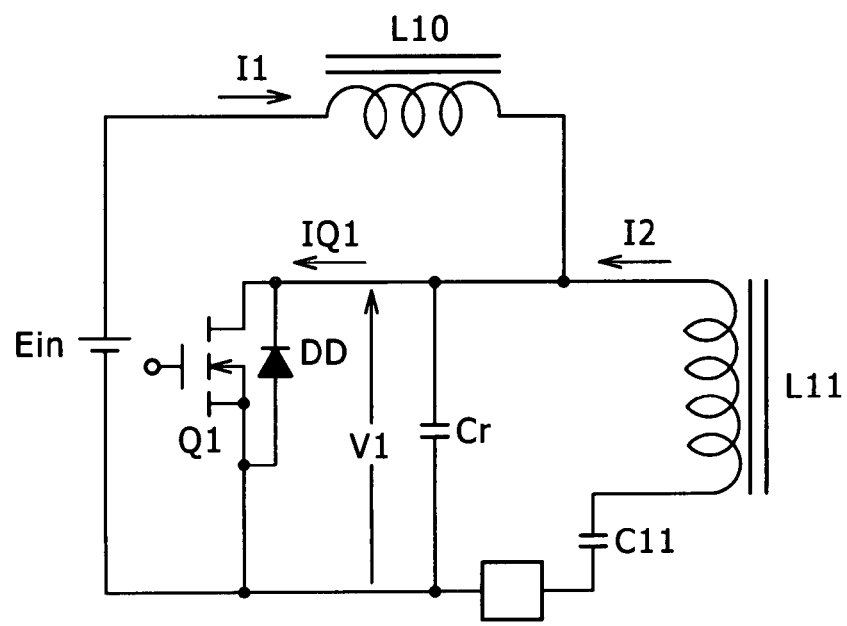
FIG. 26 is a circuit diagram showing an example of basic configuration of a class E switching converter according to the background art.
Figure 27:
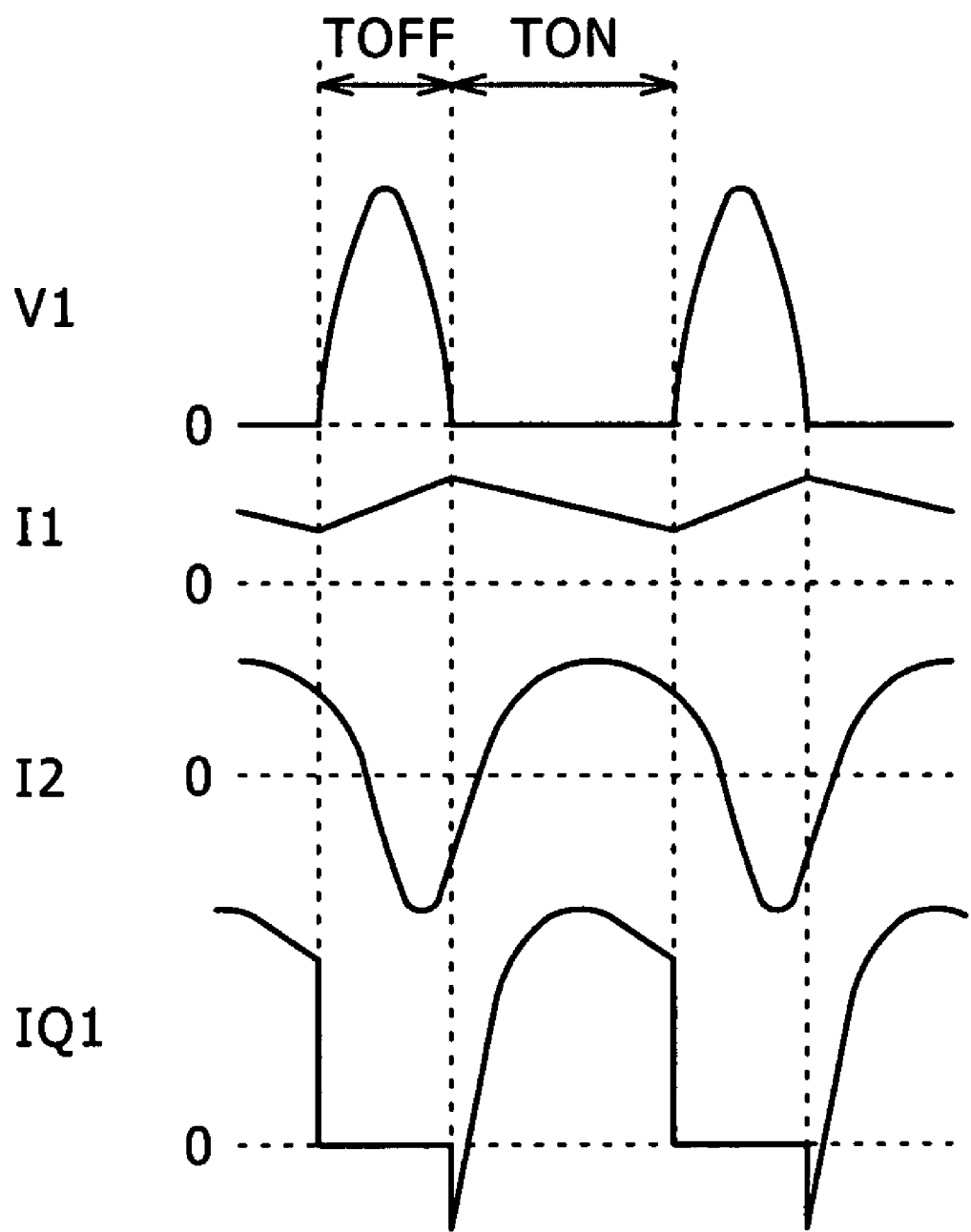
FIG. 27 is a waveform chart showing the operation of the class E switching converter according to the background art.

The class I switching circuit of the present embodiment uses the choke coil PCC that is similar to the choke coil L10 necessary in the class E converter in the past shown in FIG. 26. However, with such settings of the resonance frequencies, the value of the inductance Lo of the choke coil PCC is inevitably lower than the value of the choke coil L10. Specifically, the choke coil L10 in the class E converter shown in the background art has an inductance of about 1 mH, for example, which is considerably high as compared with the primary winding N1 of the converter transformer PIT corresponding to the choke coil L11. Thus, there occurs a correspondingly great power loss due to an iron loss, a copper loss, and the like in the choke coil L10, and a correspondingly noticeable decrease in power conversion efficiency of the power supply circuit as a whole. For example, it has been confirmed by experiment that the value of AC→DC power conversion efficiency ($\eta AC \to DC$) of a switching power supply circuit in which the class E converter shown in FIG. 26 is embodied is decreased by about one percent as compared with the power supply circuit of FIG. 22. In addition, because the power supply circuit of FIG. 26 needs the choke coil L10 to be set at a considerably high inductance as described above, parts of relatively large size are selected for a core and the like for forming the choke coil L10, for example. This is a factor in preventing facilitation of a decrease in cost, a decrease in circuit size, and the like.

In this respect, the resonant circuits in the primary side circuit of the converter using the class I switching circuit as a principal part of the present embodiment form a special configuration that has not been found in the past. With this configuration, ZVS characteristics over a wide range that is substantially the same as in the class E converter and miniaturization of the choke coil PCC are realized. This point will be described below in detail.

A primary side resonant circuit has three resonant circuits, that is, a primary side parallel resonant circuit having a primary side parallel resonance frequency fo1$p$, a primary side first series resonant circuit having a primary side first series resonance frequency fo11$s$, and a primary side second series resonant circuit having a primary side second series resonance frequency fo12$s$.

The primary side parallel resonant circuit is formed with the inductance Lo of the choke coil PCC, the leakage inductance L1, and the primary side parallel resonant capacitor Cr as components. The primary side first series resonant circuit is formed with the inductance Lo and the primary side series resonant capacitor C2 as components. The primary side second series resonant circuit is formed with the leakage inductance L1 and the primary side series resonant capacitor C2 as components.

The primary side parallel resonance frequency fo1$p$ is higher than the primary side first series resonance frequency fo11$s$, and the primary side first series resonance frequency fo11$s$ is higher than the primary side second series resonance frequency fo12$s$. The primary side first series resonance frequency fo11$s$ is substantially twice the primary side second series resonance frequency fo12$s$. The value of the inductance Lo of the choke coil PCC in this case can be set substantially equal to or lower than 1/10 of the inductance of 1 mH in the class E converter shown in the background art.

The inventor of the present application examined a range where ZVS characteristics were exhibited while variously setting relations between the three frequencies, that is, the primary side parallel resonance frequency fo1$p$, the primary side first series resonance frequency fo11$s$, and the primary side second series resonance frequency fo12$s$. As a result, it was found that the range of load power Po where ZVS characteristics are exhibited is widened most when the primary side parallel resonance frequency fo1$p$ is substantially equal to or higher than 1.5 times the primary side first series resonance frequency fo11$s$, and the primary side first series resonance frequency fo11$s$ is substantially twice the primary side second series resonance frequency fo12$s$. In the first embodiment, the value of the primary side parallel resonance frequency fo1$p$ is 103 kHz, the value of the primary side first series resonance frequency fo11$s$ is 65.5 kHz, and the value of the primary side second series resonance frequency fo12$s$ is 30 kHz.

Incidentally, the relations between the resonance frequencies described above are one example in which the range where ZVS characteristics are exhibited is widened most. Hence, when the range of load power Po is narrower, the numerical value of the above-described primary side parallel resonance frequency fo1$p$ as a frequency substantially equal to or higher than 1.5 times the primary side first series resonance frequency fo11$s$ and the primary side first series resonance frequency fo11$s$ as frequency substantially twice the primary side second series resonance frequency fo12$s$ may be in a wider range. Excellent characteristics can be obtained even when each of the values 1.5 times and twice the respective frequencies described above is changed in a range of about 30 percent.

As a result of thus expanding the range where ZVS characteristics are exhibited, the gap of the converter transformer PIT can be made even smaller, and the value of the coupling coefficient k is 0.8 or higher.

In the following, the operation of the primary side resonant circuit will be described in more detail. According to switching operation performed by the switching element Q1, voltage resonant operation of the primary side parallel resonant circuit makes a charging/discharging current flow through the primary side parallel resonant capacitor Cr in an off period of the switching element Q1. This charging/discharging current produces a resonance pulse voltage in the shape of substantially a half sinusoidal wave as a voltage across the primary side parallel resonant capacitor Cr. In the circuit of FIG. 1, the primary side parallel resonant circuit has the primary winding N1 connected via the primary side series resonant capacitor C2. Therefore, in the primary winding N1, the resonance pulse voltage is superimposed on the alternating voltage generated according to switching current.

At this time, because both the capacitance of the smoothing capacitor Ci and the capacitance of the primary side series resonant capacitor C2 are selected to be much larger than the capacitance of the primary side parallel resonant capacitor Cr, the smoothing capacitor Ci and the primary side series resonant capacitor C2 can be equivalently regarded as a short circuit, and the primary side parallel resonance frequency fo1$p$ is practically determined by the values of the inductance Lo of the choke coil PCC, the leakage inductance L1, and the capacitance of the primary side parallel resonant capacitor Cr. That is, the primary side parallel resonance frequency fo1$p$ is governed by the values of the inductance Lo, the leakage inductance L1, and the capacitance of the primary side parallel resonant capacitor Cr. In the first embodiment, the capacitance of the primary side parallel resonant capacitor Cr is 5600 pF, and the inductance Lo is 68 µH.

In addition, according to the switching operation of the switching element Q1, the primary side first series resonant circuit performs resonant operation such that a resonance current flows through a series path of the primary side series resonant capacitor C2, the choke coil PCC, and the smoothing capacitor Ci. Because the capacitance of the smoothing capacitor Ci is much larger than the capacitance of the primary side series resonant capacitor C2, the smoothing capacitor Ci can be equivalently regarded as a short circuit, and the primary side first series resonance frequency fo11$s$ is practically determined by the values of the inductance Lo of the choke coil PCC and the capacitance of the primary side series resonant capacitor C2. That is, the primary-side first series resonance frequency fo11$s$ is governed by the value of the inductance Lo and the value of the capacitance of the primary side series resonant capacitor C2. In the first embodiment, the capacitance of the primary side series resonant capacitor C2 is 0.082 µF.

In addition, the primary side second series resonant circuit performs resonant operation such that a resonance current flows through a series path of the primary side series resonant capacitor C2, the primary winding N1, and the switching element Q1 in an on period of the switching element Q1. In the on period of the switching element Q1, the value of conduction resistance of the switching element Q1 is very low. In an off period of the switching element Q1, a resonance current flows through the body diode DD, and the value of conduction resistance of the body diode DD in this case is also very low. Therefore the switching element Q1 can be equivalently regarded as a short circuit, and the primary side second series resonance frequency fo12s is practically determined by the values of the leakage inductance L1 and the capacitance of the primary side series resonant capacitor C2. That is, the primary side second series resonance frequency fo12s is governed by the value of the leakage inductance L1 and the value of the capacitance of the primary side series resonant capacitor C2.

Figure 2:
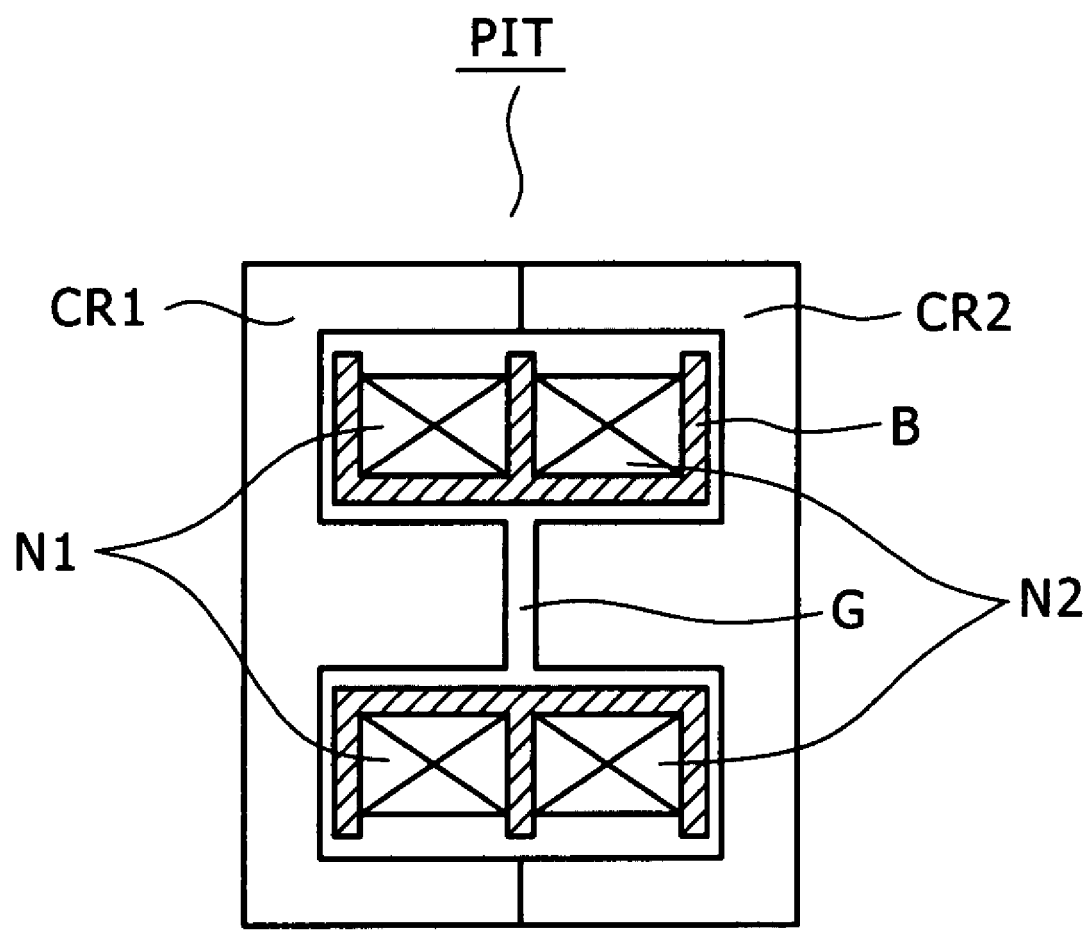
FIG. 2 is a diagram showing an example of structure of a converter transformer provided in the power supply circuit according to the first embodiment.

FIG. 2 shows an example of structure of the converter transformer PIT provided in the switching power supply circuit according to the present embodiment. As shown in this figure, the converter transformer PIT has an EE type core (EE-shaped core) formed by combining an E-shaped core CR1 and an E-shaped core CR2 made of ferrite material with each other such that magnetic legs of the E-shaped core CR1 are opposed to magnetic legs of the E-shaped core CR2. Then, the converter transformer PIT has a bobbin B formed by a resin or the like, and having a shape such that a primary side winding part and a secondary side winding part are divided from each other so as to be independent of each other. The primary winding N1 is wound around one winding part of the bobbin B. The secondary winding N2 is wound around the other winding part of the bobbin. B. The bobbin B thus wound with the primary winding N1 and the secondary side winding is attached to the above-described EE-shaped core (CR1 and CR2). Thereby the primary winding N1 and the secondary winding N2 are wound in respective different winding regions around the central magnetic leg of the EE-shaped core. The structure of the converter transformer PIT as a whole is thus obtained.

In addition, a gap G of about 0.8 mm is formed in the central magnetic leg of the EE-shaped core. Thereby a coupling coefficient k=about 0.82 is obtained between the primary side and the secondary side. This coupling coefficient k represents a degree of coupling that may be regarded as loose coupling. The loose coupling can produce the leakage inductance L1 and the leakage inductance L2, and prevents a magnetic flux from being saturated easily in the EE-shaped core. In the first embodiment, an EER-35 is used as a core material, the number of turns of the primary winding N1 is set to 40 T (turns), and the number of turns of the secondary winding N2 is set to 33 T.

The choke coil PCC can also be formed by providing a winding to an EE-shaped core of a predetermined shape and a predetermined size.

The switching power supply circuit according to the first embodiment deals with load power of 300 W as maximum load power Pomax and load power of 0 W (no load) as minimum load power Pomin. The rated level of the secondary side direct-current output voltage Eo is 175 V. As for the alternating input voltage VAC, the switching power supply circuit can deal with a 100-V system.

Figure 3A:
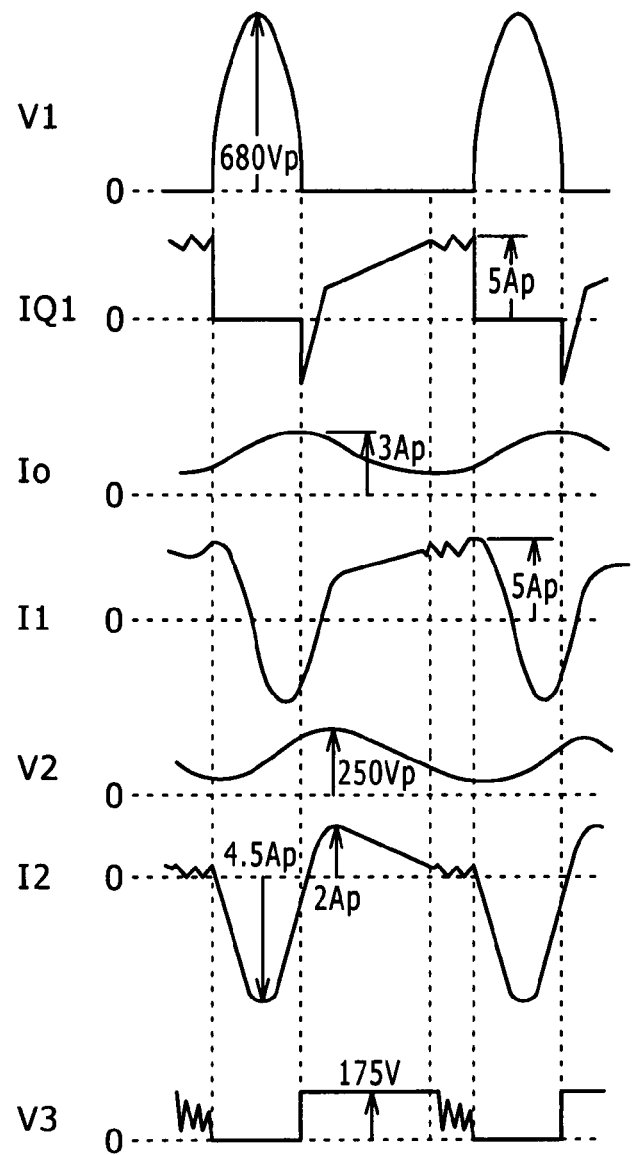
FIGS. 3A and 3B are waveform charts showing operations of principal parts in the power supply circuit according to the first embodiment on the basis of switching cycles.
Figure 3B:
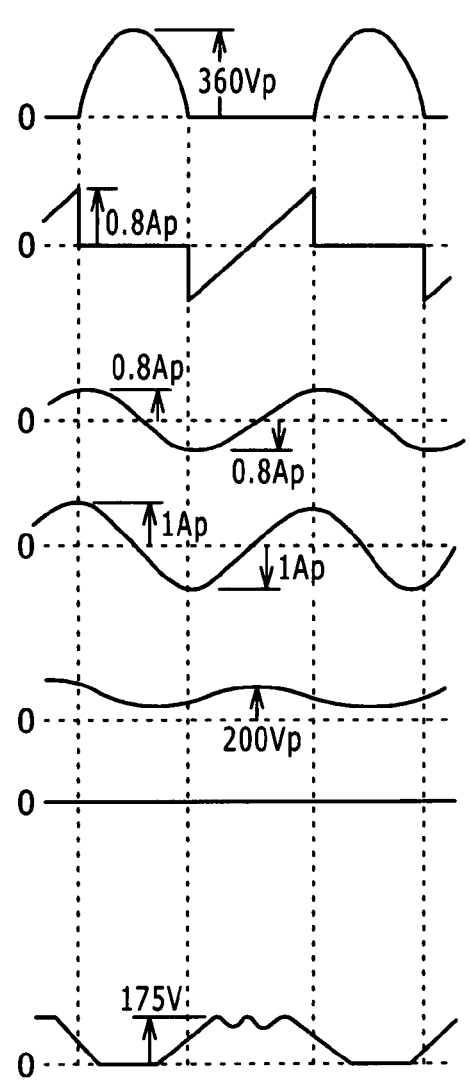

Waveform charts of FIG. 3A and FIG. 3B are cited as results of experiment on the power supply circuit according to the first embodiment shown in FIG. 1. FIG. 3A shows a switching voltage V1, a switching current IQ1, a choke coil current Io, a primary winding current I1, a voltage V2 of the primary side series resonant capacitor, a secondary side rectifying element current I2, and a secondary side alternating voltage V3 under conditions of the maximum load power Pomax=300 W and the alternating input voltage VAC=100 V.

FIG. 3B shows the switching voltage V1, the switching current IQ1, the choke coil current Io, the primary winding current I1, the voltage V2 of the primary side series resonant capacitor (voltage across the primary side series resonant capacitor), the secondary side rectifying element current I2, and the secondary side alternating voltage V3 under conditions of the minimum load power Pomin=0 W and the alternating input voltage VAC=100 V.

The waveform chart shown in FIG. 3A will be described in more detail. The switching voltage V1 is a drain-to-source voltage of the switching element Q1 that is supplied with the direct-current input voltage Ei of the smoothing capacitor Ci and performs switching operation. One switching cycle includes a period TON in which the switching element Q1 is to be turned on and a period TOFF in which the switching element Q1 is to be turned off. The switching voltage V1 is at a zero level during the period TON, and has a resonant pulse waveform during the period TOFF. The voltage resonant pulse of the switching voltage V1 is obtained as a sinusoidal resonant waveform as a result of the resonant operation of the primary side parallel resonant circuit.

The switching current IQ1 flows from the drain side to the source side of the switching element Q1, or flows through the body diode DD. The switching current IQ1 is at a zero level during the period TOFF. When turn-on timing is reached with the period TOFF ended and the period TON started, the switching current IQ1 first flows through the body diode DD, thus having a waveform of negative polarity, and is then inverted to flow from the drain to the source, thus having a waveform of positive polarity.

The choke coil current Io flows from the smoothing capacitor Ci into the class I switching circuit. The choke coil current Io is a pulsating current.

The primary winding current I1 flows through the primary winding N1 according to the switching operation of the switching element Q1. The primary winding current I1 has a current waveform obtained by combining the switching current IQ1 and a current flowing through the primary side parallel resonant capacitor Cr with each other. The switching element Q1 performs on/off operation, whereby the resonant pulse voltage as the switching voltage V1 during the period TOFF is applied to the primary side first series resonant circuit and the primary side second series resonant circuit. Thereby the primary side first series resonant circuit and the primary side second series resonant circuit perform resonant operation, and the primary winding current I1 forms a near-sinusoidal alternating waveform according to the switching cycle.

The voltage V2 of the primary side series resonant capacitor is generated by a combined current of currents flowing through the primary side first series resonant circuit and the primary side second series resonant circuit, and is a voltage obtained by adding together the substantially sinusoidal waveforms of the respective currents.

The secondary side rectifying element current I2 flows into the secondary side rectifying element Do, and is zero at a voltage polarity change point. This is an effect of the partial voltage resonant circuit. A favorable effect of improving efficiency is obtained when the value of the secondary side partial voltage resonant capacitor C3 is in a range of 330 pF to 1000 pF. The addition of the parallel resonant circuit improves power conversion efficiency ($\eta AC \rightarrow DC$) to be described later by about 0.2 percentage points as compared with a case where the parallel resonant circuit is not added.

The secondary side alternating voltage V3 is a voltage between a connected circuit of the secondary winding N2 and the secondary side partial voltage resonant capacitor C3 and a secondary side ground point. The secondary side alternating voltage V3 is input to the secondary side rectifying element Do. In each period of a half cycle of the secondary side alternating voltage V3, a forward-direction voltage is applied to the diodes Do1 and Do4, and accordingly the diodes Do1 and Do4 conduct. Thereby the secondary side alternating voltage V3 is smoothed as secondary side direct-current output voltage Eo in the secondary side smoothing capacitor Co. In each period of another half cycle of the secondary side alternating voltage V3, a forward-direction voltage is applied to the diodes Do2 and Do3, and accordingly the diodes Do2 and Do3 conduct. Thereby the secondary side alternating voltage V3 is smoothed as secondary side direct-current output voltage Eo in the secondary side smoothing capacitor Co.

Figure 4:
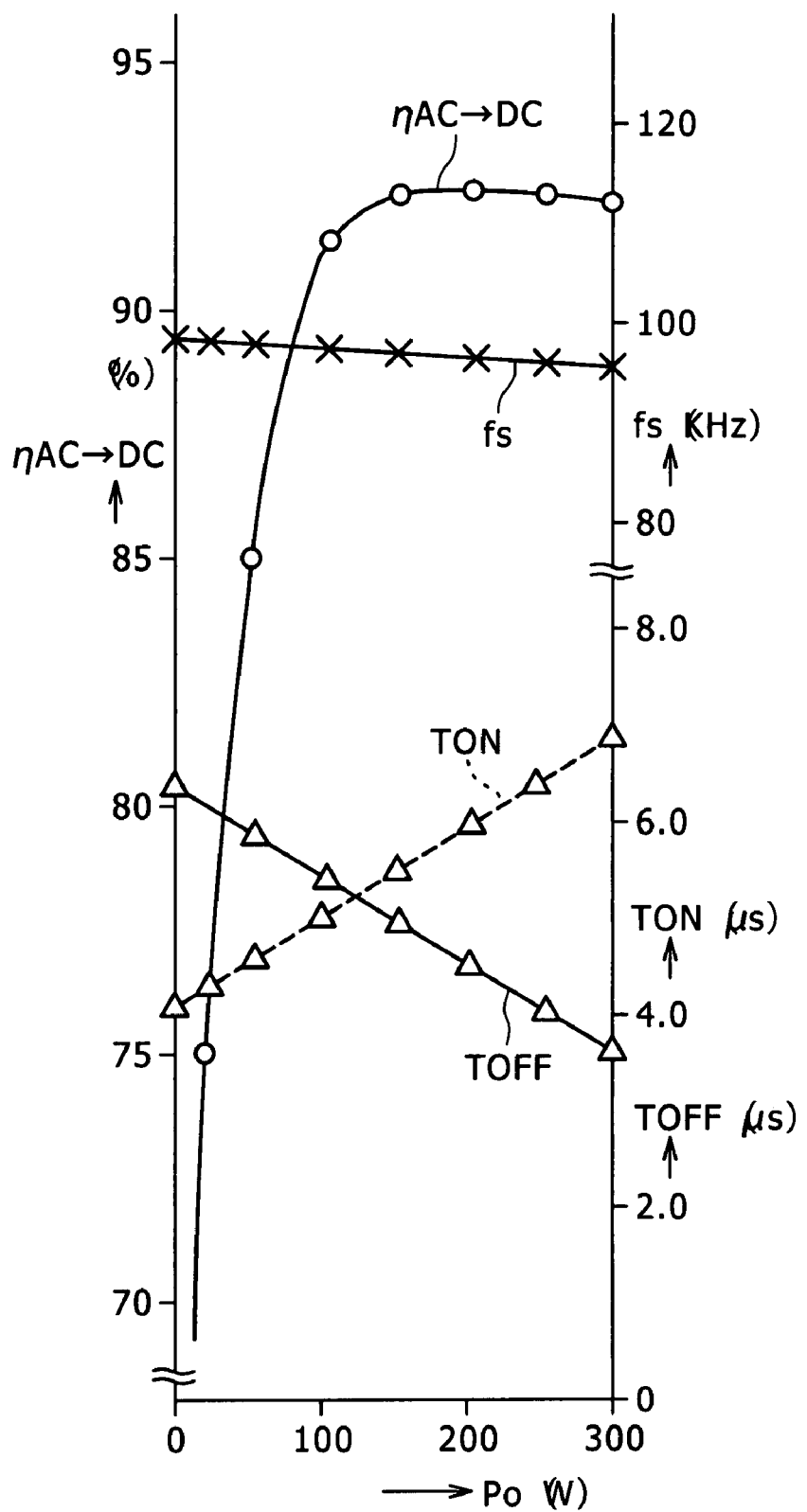
FIG. 4 is a diagram showing characteristics of variation of AC→DC power conversion efficiency and switching frequency with respect to load variation in the power supply circuit according to the first embodiment.

FIG. 4 shows switching frequency fs, efficiency of power conversion ($\eta AC \rightarrow DC$) from the input to the output of the switching power supply circuit, the period TON, and the period TOFF with respect to load variation from the maximum load power Pomax=300 W to the minimum load power Pomin=0 w under an input condition of the alternating input voltage VAC=100 V in the switching power supply circuit according to the first embodiment.

A variable range $\Delta fs$, which corresponds to this load power variation, needs the switching frequency fs only to be a very narrow range $\Delta fs$=1.8 kHz. As a result, excellent transient response characteristics when load power changes sharply are obtained.

It has been confirmed that ZVS characteristics are obtained between the maximum load power Pomax=300 W and the minimum load power Pomin=0 W. In addition, because the choke coil PCC has a low inductance Lo of 68 μH, a loss in the choke coil PCC is small. Further, the value of the coupling coefficient of the converter transformer is 0.82, which is higher than the value in the past. These all lead to a result of an improvement in power conversion efficiency, and a high efficiency of 92.5% is obtained under the conditions of the alternating input voltage VAC=100 V and the maximum load power Pomax=300 W. Incidentally, it has been confirmed that even when the value of the coupling coefficient of the converter transformer is set in a range of 0.8 to 0.85 as the mode of primary side connection of the switching power supply circuit of FIG. 26, the primary side second series resonant circuit in the present embodiment is formed, but the primary side first series resonant circuit is not formed. In this case, a series resonance current flowing on the primary side flows as primary winding current I1 as it is. On the other hand, the present embodiment is provided with two sets of the primary side first series resonant circuit and the primary side second series resonant circuit as primary side series resonant circuit. Thereby a series resonance current to flow on the primary side branches off into the primary winding N1 and the choke coil PCC. Thus the magnitude of the primary winding current I1 is decreased, and the efficiency is improved.

On the secondary side, partial voltage resonant operation is performed in turn-on/turn-off timing of the secondary side rectifying element Do. A current that is to flow into the secondary side rectifying element Do flows to the secondary side partial voltage resonant capacitor, whereby a conduction loss and a switching loss in the rectifier diodes are reduced.

Incidentally, in each of the first embodiment described above and a second embodiment and a third embodiment to be described later, the primary side rectifying element Di and the smoothing capacitor Ci are provided on the primary coupling coefficients higher than the value in the past, sufficient ZVS characteristics are exhibited and the power conversion efficiency can maintain a sufficiently high value.

Figure 23:
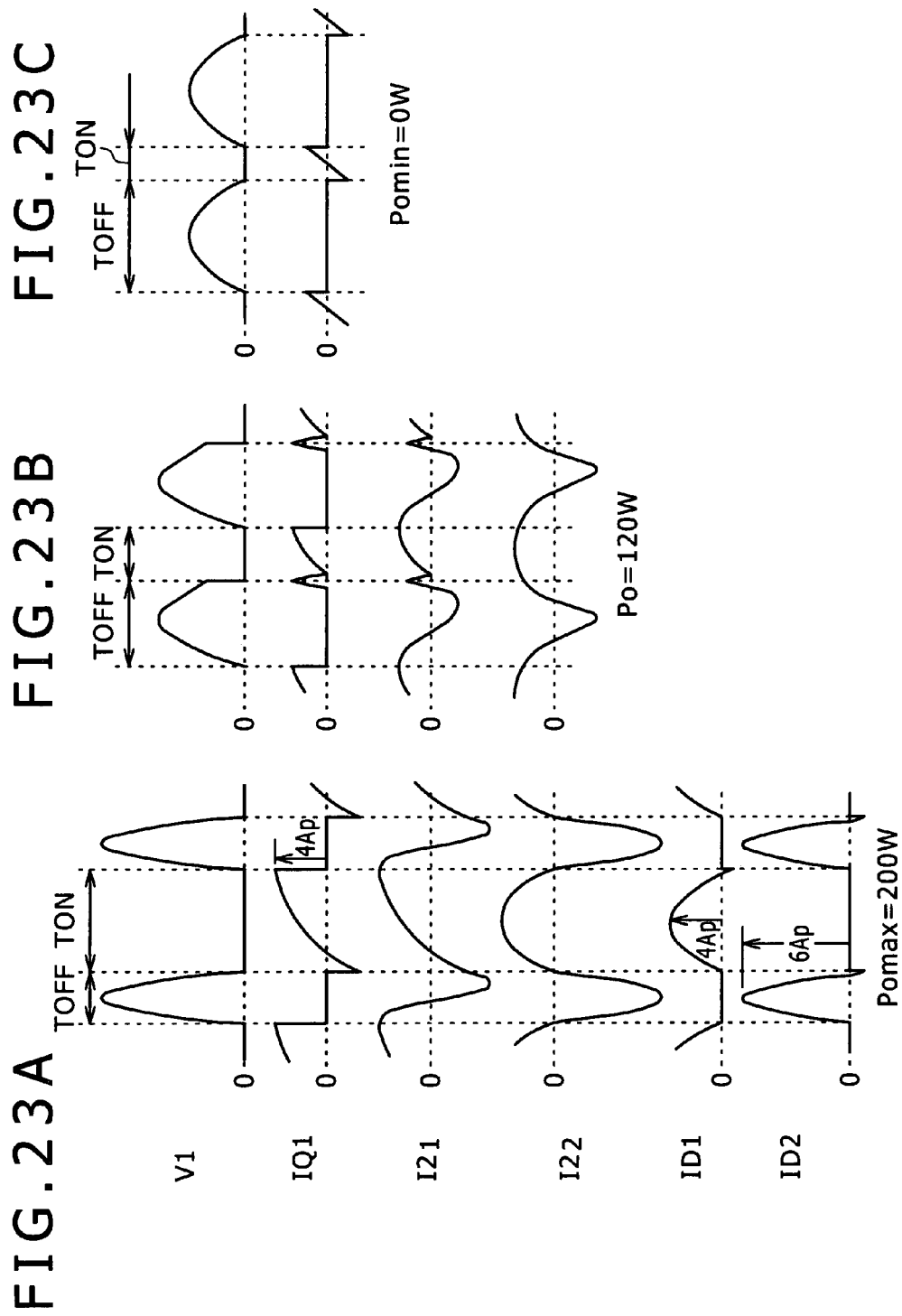
FIGS. 23A, 23B, and 23C are waveform charts showing operations of principal parts in the power supply circuit illustrated in the background art.
Figure 24:
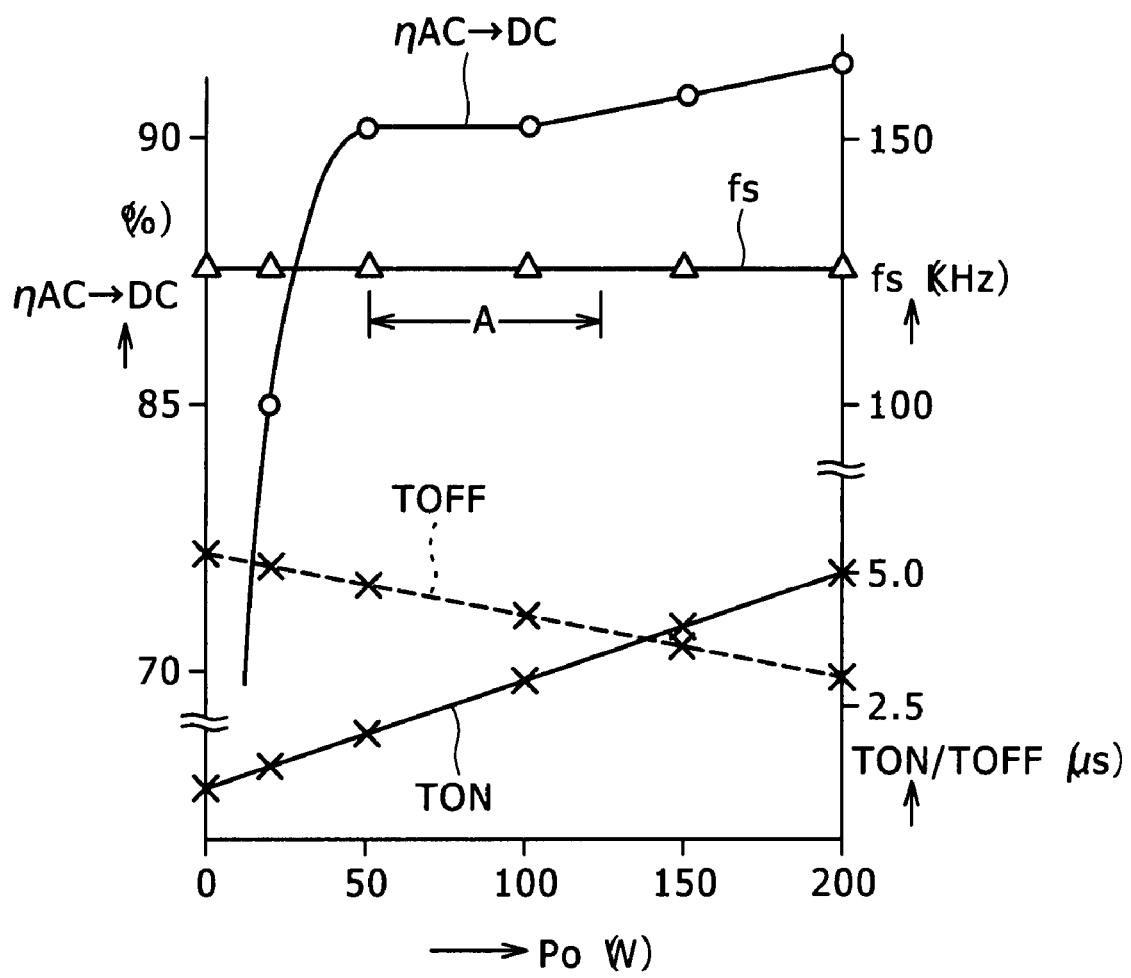
FIG. 24 is a diagram showing characteristics of variation of AC→DC power conversion efficiency, switching frequency, and the on period and off period of a switching element with respect to load variation in the power supply circuit illustrated in the background art.
Figure 25:
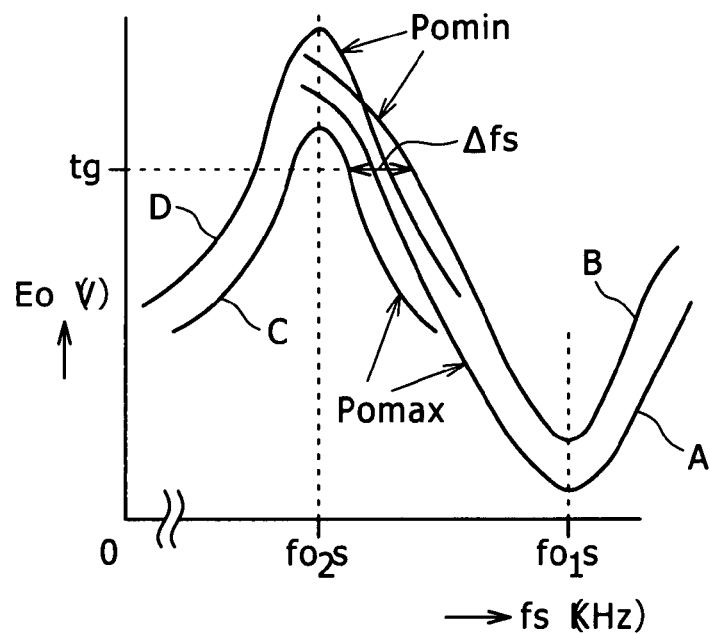
FIG. 25 is a diagram conceptually showing constant-voltage control characteristics of the power supply circuit illustrated in the background art.

Thus, according to the present embodiment employing the class I switching circuit, error operation under medium load is eliminated, and proper ZVS operation is obtained. As shown in FIG. 23B for the background art, this error operation is a phenomenon in which the switching element Q1 is turned on and a switching current IQ1 of positive polarity flows between the source and the drain before turn-on timing (a start of a period TON). However, according to the operation of the switching current IQ1 in the class I switching circuit of the present embodiment, such a current does not flow, and the error operation in the past does not occur. This is a factor in improving the power conversion efficiency.

Further, because the present embodiment has the choke coil PCC, the waveform of the input current I1 is closer to a sinusoidal wave, whereby an effect of reducing high-frequency noise is also obtained. In addition, the choke coil PCC in this case has a low inductance Lo of 68 μH. It is therefore possible to reduce the size of the choke coil PCC and in turn reduce device size, and further reduce device price.

A comparison with the switching power supply circuit of FIG. 26 illustrating the background art indicates that in side, and power input to the primary side is alternating-current power. However, in each of the embodiments, when the power input to the primary side is direct-current power, the action and effect of each principal part in the switching power supply circuit according to the present embodiment do not particularly differ except that two of the four diodes of the primary side rectifying element Di conduct according to the polarity of the input direct-current power. Further, when the primary side rectifying element Di is not provided, the value of the smoothing capacitor Ci is made lower, and direct-current power is supplied as input power, the action and effect of each principal part in the switching power supply circuit according to the present embodiment do not particularly differ except that the input power is alternating-current power or direct-current power.

Examples of Modification of First Embodiment

Figure 5:
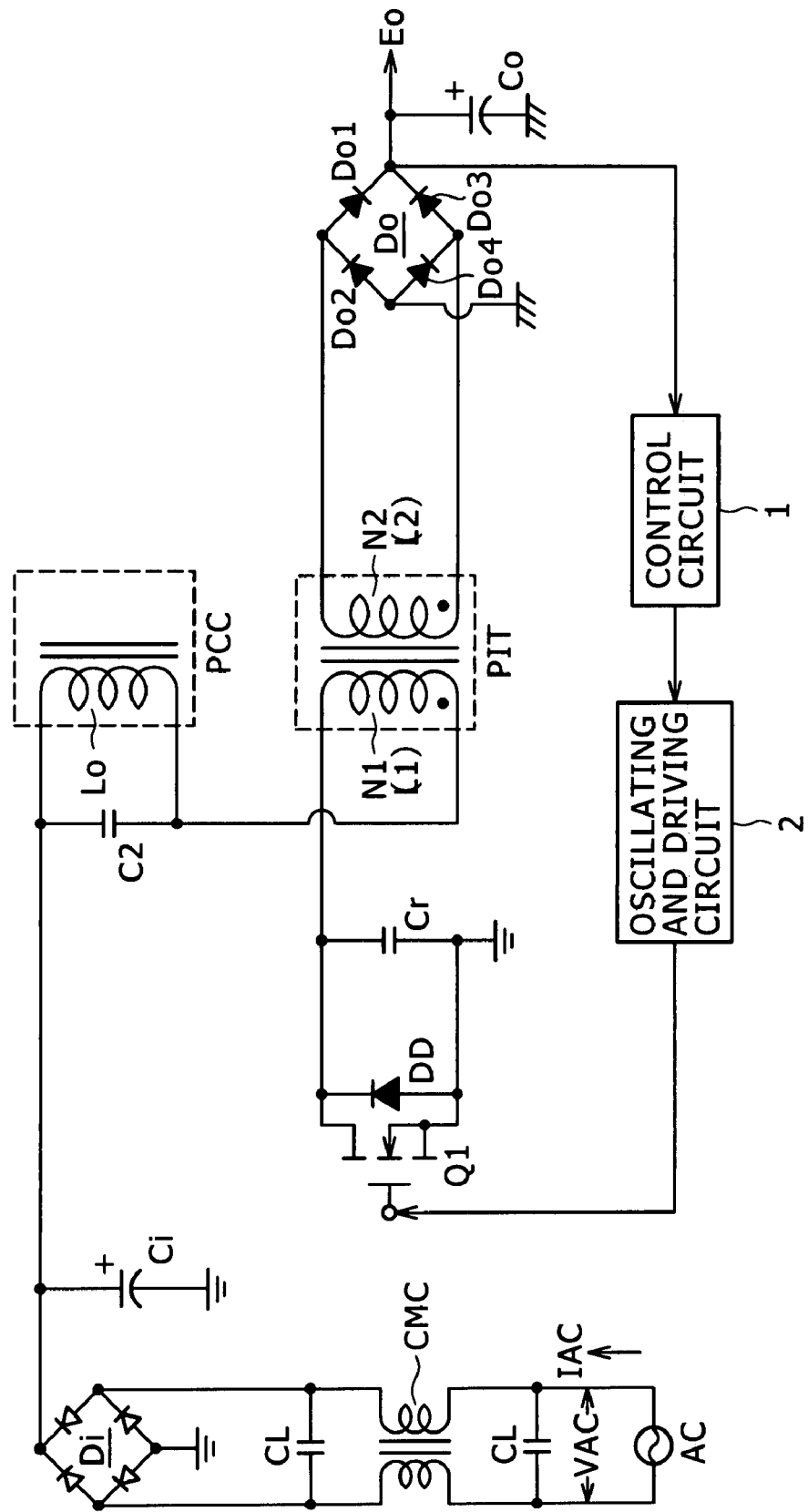
FIG. 5 is a circuit diagram showing an example of configuration of a power supply circuit according to an example of modification of the first embodiment.

While various modes are possible as examples of modification of the above-described first embodiment, typical examples will be illustrated in the following. First, FIG. 5 shows an example of modification of the class I switching circuit. In the first embodiment, the primary side series resonant capacitor C2 is grounded. However, as shown in FIG. 5, even when the primary side series resonant capacitor C2 is connected to the smoothing capacitor Ci, the same action and effect as in the first embodiment can be obtained. That is, the capacitance of the smoothing capacitor Ci is much larger than the capacitance of the primary side series resonant capacitor C2, and the smoothing capacitor Ci can be regarded as a short circuit in a high-frequency equivalent circuit, so that the same effect as in a case where the primary side series resonant capacitor C2 is grounded by the smoothing capacitor Ci is obtained.

Figure 6A:
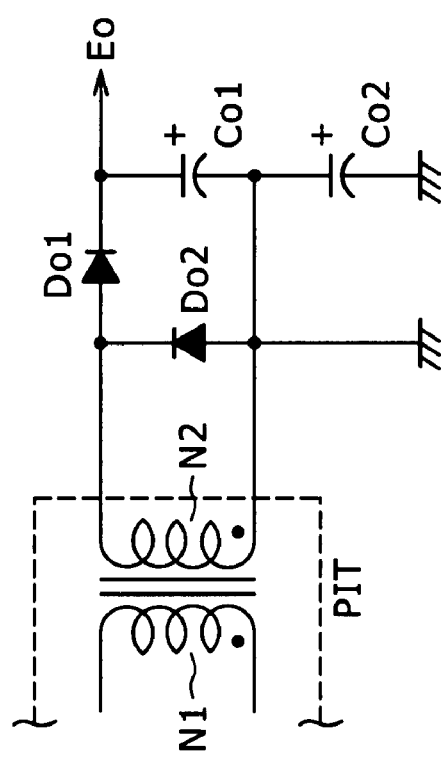
FIGS. 6A and 6B are circuit diagrams of other secondary sides of the first embodiment.
Figure 6B:
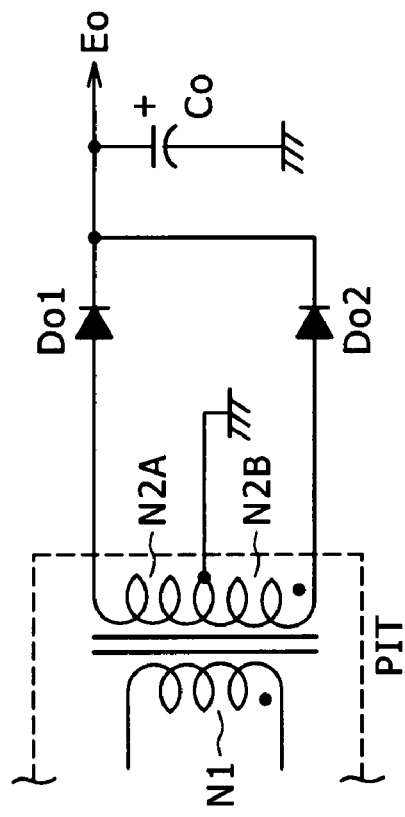

Next, FIGS. 6A and 6B show typical examples of secondary side modified circuits in the first embodiment. The secondary side winding and the secondary side rectifying and smoothing circuit is not limited to the above-described embodiment. Even with a double-wave rectifier circuit shown in FIG. 6A, the same effects as in the above embodiment can be obtained. In addition, even with a voltage doubler rectifier circuit shown in FIG. 6B, the same effects as in the above embodiment can be obtained. In these cases, there is no partial voltage resonant circuit, and therefore power conversion efficiency is decreased by about 0.2 percentage points as compared with a case where the partial voltage resonant circuit is provided.

Second Embodiment

Figure 7:
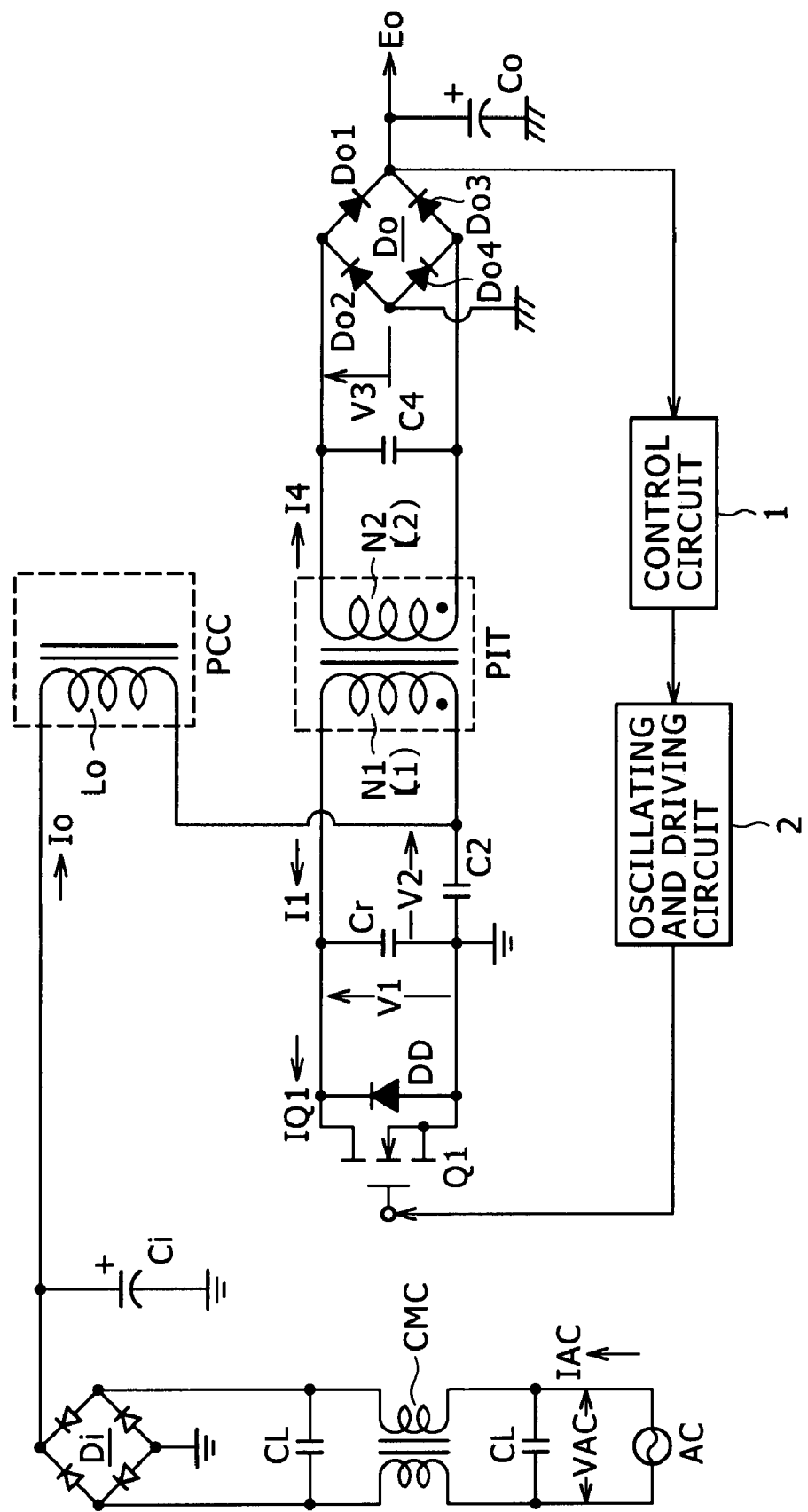
FIG. 7 is a circuit diagram showing an example of configuration of a power supply circuit according to a second embodiment.

FIG. 7 shows a switching power supply circuit according to a second embodiment. The same parts in this switching power supply circuit as in the switching power supply circuit according to the foregoing first embodiment are identified by the same reference numerals, and detailed description thereof will be omitted. The switching power supply circuit according to the second embodiment is different from the switching power supply circuit according to the first embodiment as follows. The switching power supply circuit according to the first embodiment does not have a resonant circuit or has a partial voltage resonant circuit on the secondary side. The switching power supply circuit according to the second embodiment includes a secondary side parallel resonant circuit having a secondary side parallel resonant capacitor having a higher capacitance value than the value of the capacitance of the partial voltage resonant capacitor.

On a primary side, this switching power supply circuit has a primary side parallel resonant circuit whose resonance frequency is governed by the inductance Lo of a choke coil PCC, a leakage inductance L1 occurring at a primary winding N1, and a primary side parallel resonant capacitor Cr. Further, the circuit has two current resonant circuit sets, that is, a primary side first series resonant circuit whose resonance frequency is governed by the inductance Lo and a primary side series resonant capacitor C2, and a primary side second series resonant circuit whose resonance frequency is governed by the leakage inductance L1 and the primary side series resonant capacitor C2. On a secondary side, the switching power supply circuit has a secondary side parallel resonant circuit formed by connecting a secondary side parallel resonant capacitor C4 to a secondary winding N2 and a full-wave bridge rectifier circuit having a secondary side rectifying element Do composed of diodes D1 to D4 and a smoothing capacitor Co for obtaining a secondary side direct-current output voltage Eo. The switching power supply circuit as a whole forms a multiple resonant converter.

A primary side first series resonance frequency as resonance frequency of the primary side first series resonant circuit is set to be substantially twice a primary side second series resonance frequency as resonance frequency of the primary side second series resonant circuit. A primary side parallel resonance frequency as resonance frequency of the primary side parallel resonant circuit is set to be substantially equal to or higher than 1.5 times the primary side first series resonance frequency. A resonance current is made to flow through the parallel resonant circuit on the secondary side.

Specifications of the switching power supply circuit according to the second embodiment in FIG. 7 and main concrete constants of parts in the switching power supply circuit according to the second embodiment are as follows. As for load power of the switching power supply circuit according to the second embodiment, a maximum load power Pomax=300 W, and a minimum load power Pomin=0 W. ZVS characteristics are maintained in this range. The value of an alternating input voltage VAC is 100 V. The value of the secondary side direct-current output voltage Eo is 175 V.

The value of the inductance of the choke coil PCC is 68 µH. A material for the core of a converter transformer PIT is an EER-35. A gap G of the core is set at 0.8 mm. The primary winding N1 is set to 40 T. The secondary winding N2 is set to 33 T. The coupling coefficient of the converter transformer is 0.82. The value of the primary side parallel resonant capacitor Cr of the primary side parallel resonant circuit is 5600 pF. The value of the primary side series resonant capacitor C2 is 0.1 µF. The value of the secondary side parallel resonant capacitor C4 is 0.015 µF. In the second embodiment having such constants, the value of primary side parallel resonance frequency fo1$p$ is 119 kHz, the value of primary side first series resonance frequency fo11$s$ is 59 kHz, the value of primary side second series resonance frequency fo12$s$ is 33 kHz, and the value of secondary side parallel resonance frequency fo2$p$ is 115 kHz, which is substantially equal to the primary side parallel resonance frequency.

Figure 8A:
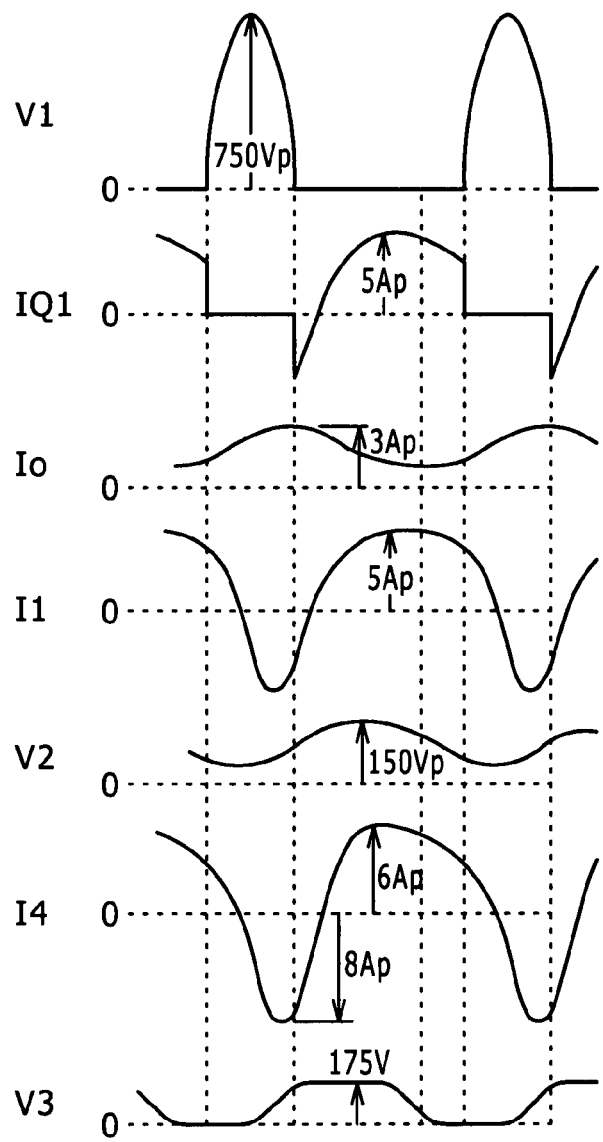
FIGS. 8A and 8B are waveform charts showing operations of principal parts in the power supply circuit according to the second embodiment on the basis of switching cycles.
Figure 8B:
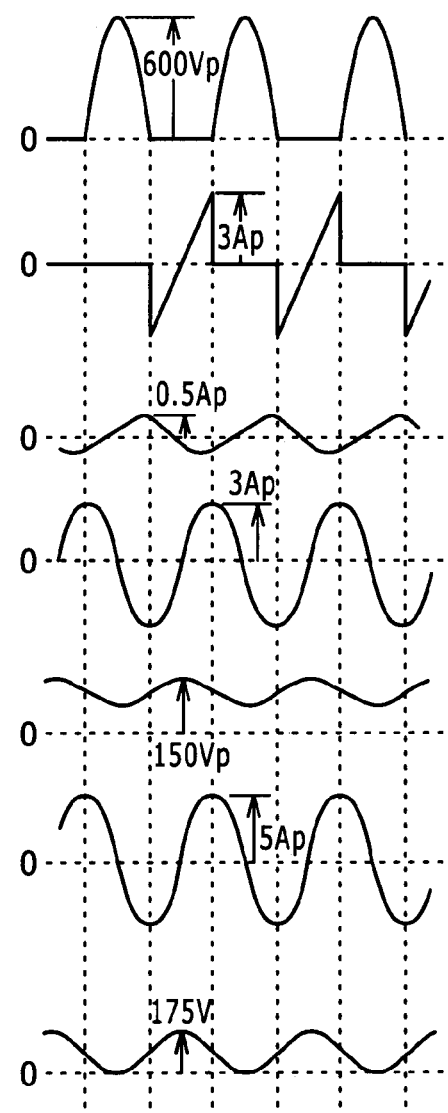

Waveform charts of FIG. 8A and FIG. 8B are cited as results of experiment on the power supply circuit according to the second embodiment shown in FIG. 7. FIG. 8A shows a switching voltage V1, a switching current IQ1, a choke coil current Io, a primary winding current I1, a voltage V2 of the primary side series resonant capacitor, a secondary winding current I4, and a secondary side alternating voltage V3 under conditions of the maximum load power Pomax=300 W and the alternating input voltage VAC=100 V.

FIG. 8B shows the switching voltage V1, the switching current IQ1, the choke coil current Io, the primary winding current I1, the voltage V2 of the primary side series resonant capacitor (voltage across the primary side series resonant capacitor), the secondary winding current I4, and the secondary side alternating voltage V3 under conditions of the minimum load power Pomin=0 W and the alternating input voltage VAC=100 V.

As characteristics of waveforms shown in FIG. 8A and FIG. 8B, for example, the secondary winding current I4 flows as a near-sinusoidal wave by the action of the secondary side parallel resonant circuit, and the secondary side alternating voltage V3 has gentle rising-edge and falling-edge characteristics, so that a switching loss in the secondary side circuit is reduced.

Figure 9:
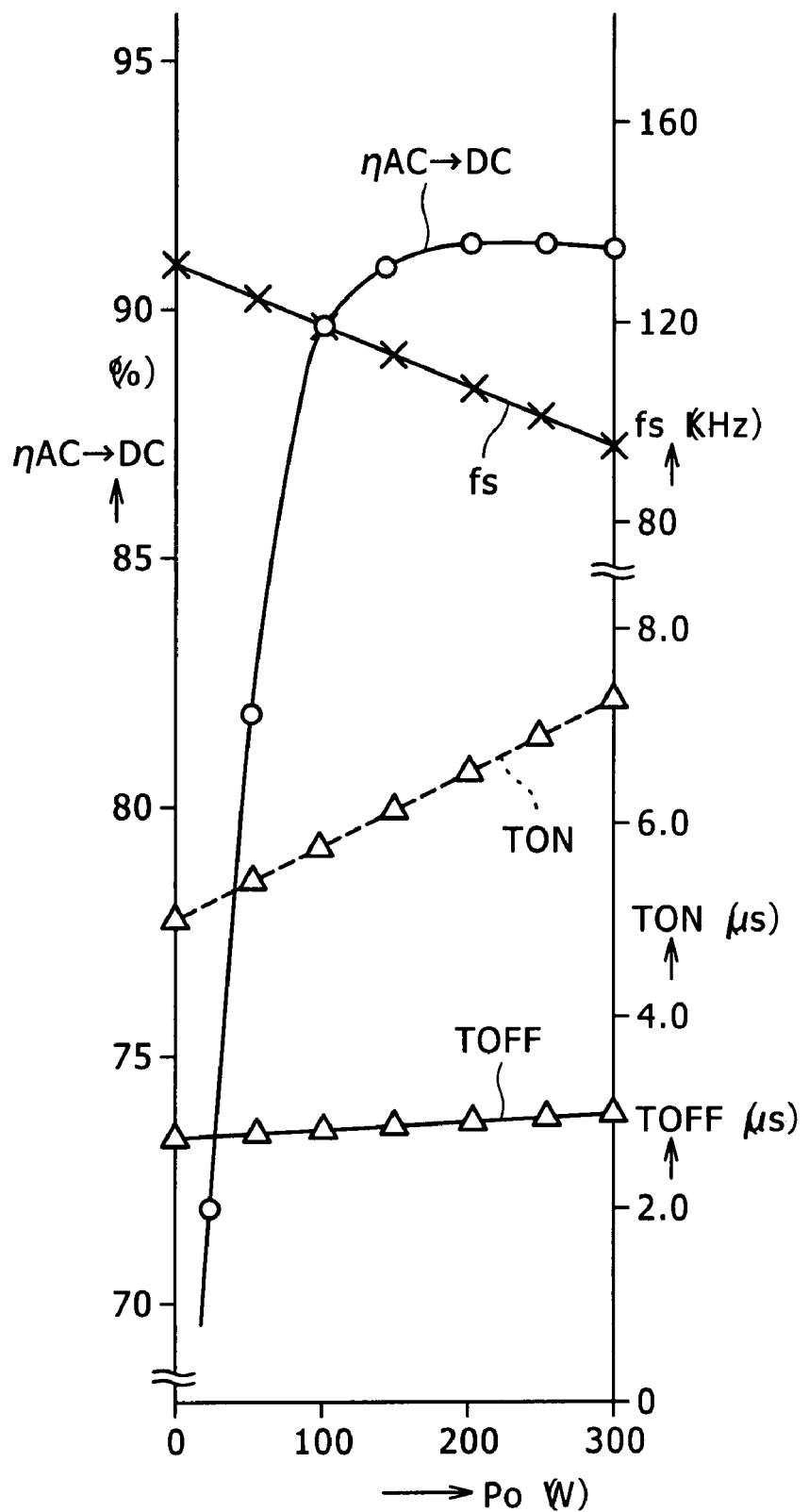
FIG. 9 is a diagram showing characteristics of variation of AC→DC power conversion efficiency and switching frequency with respect to load variation in the power supply circuit according to the second embodiment.

FIG. 9 shows switching frequency fs, efficiency of power conversion (ηAC→DC) from the input to the output of the switching power supply circuit, a period TON, and a period TOFF with respect to load variation from the maximum load power Pomax=300 W to the minimum load power Pomin=0 W under an input condition of the alternating input voltage VAC=100 V in the switching power supply circuit according to the second embodiment.

A variable range Δfs necessary for the switching frequency fs for this load power variation is Δfs=33 kHz. Experimental results indicate that the variable range Δfs is related to the value of the gap G. It has been confirmed that the variable range Δfs can be narrowed to about 10 kHz by increasing the value of the gap G to 1.6 mm, for example.

It has also been confirmed that ZVS characteristics are obtained between the maximum load power Pomax=300 W and the minimum load power Pomin=0 W. In addition, because the choke coil PCC has a low inductance Lo of 68 µH, a loss in the choke coil PCC is small. Further, the value of the coupling coefficient of the converter transformer is 0.82, which is higher than the value in the past. These all lead to a result of an improvement in power conversion efficiency, and a high efficiency of 91.6% is obtained under the conditions of the alternating input voltage VAC=100 V and the maximum load power Pomax=300 W. Incidentally, it has been confirmed that even when the value of the coupling coefficient of the converter transformer is set in a range of 0.8 to 0.85 as coupling coefficients higher than the value in the past, sufficient ZVS characteristics are exhibited.

Thus, according to the present embodiment employing the class I switching circuit and the secondary side parallel resonant circuit, the class I switching circuit having the same action and effect as in the first embodiment is used, error operation under medium load is eliminated, and proper ZVS operation is obtained. As for the secondary side, the secondary side parallel resonant circuit is used, whereby a conduction loss and a switching loss in the rectifier diodes are reduced.

Examples of Modification of Second Embodiment

Figure 10:
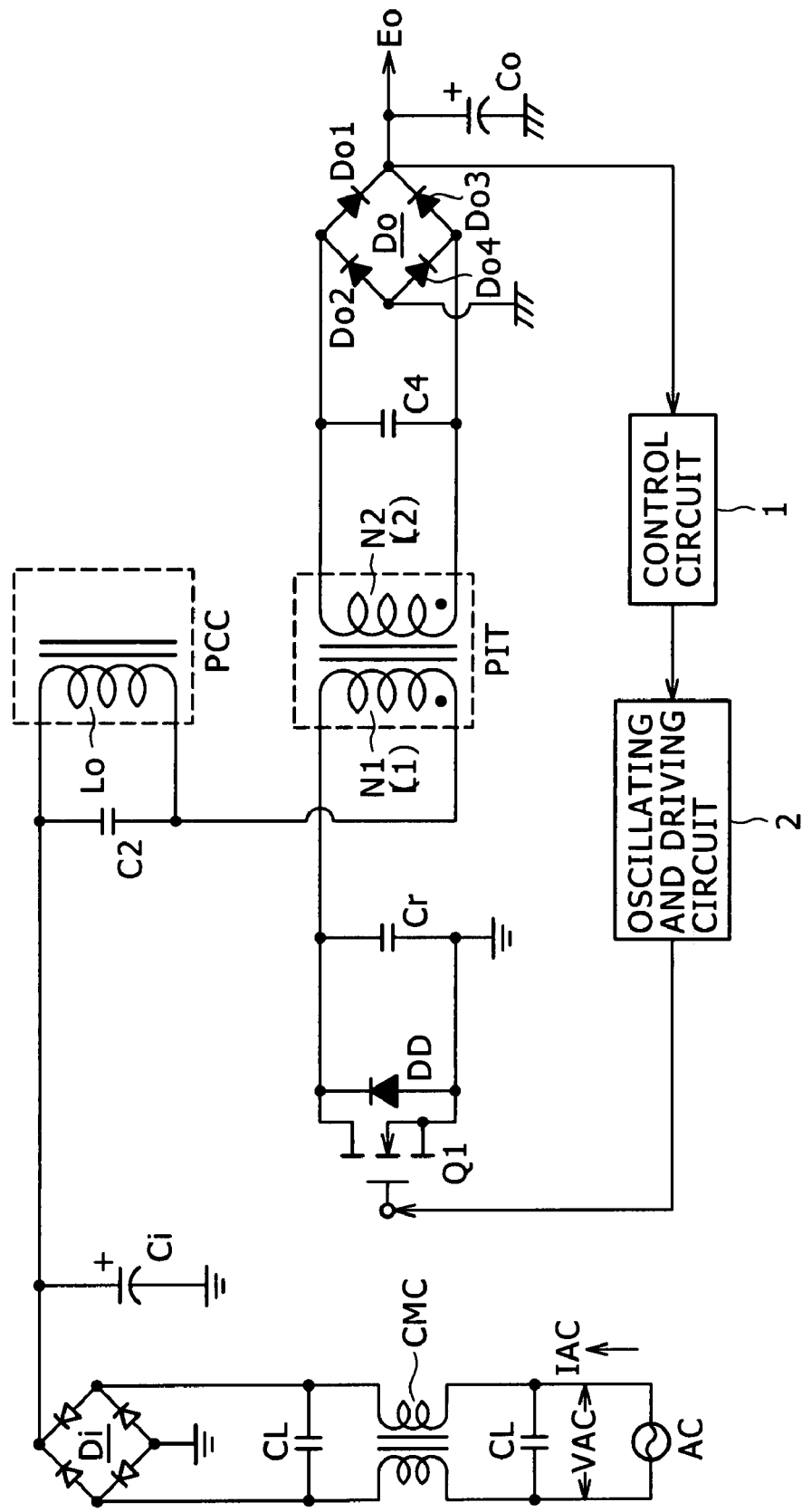
FIG. 10 is a circuit diagram showing an example of configuration of a power supply circuit according to an example of modification of the second embodiment.

While various modes are possible as examples of modification of the above-described second embodiment, typical examples will be illustrated in the following. First, FIG. 10 shows an example of modification of the class I switching circuit. In the second embodiment, the primary side series resonant capacitor C2 is grounded. However, as shown in FIG. 10, even when the primary side series resonant capacitor C2 is connected to the smoothing capacitor Ci, the same action and effect as in the second embodiment can be obtained. That is, the capacitance of the smoothing capacitor Ci is much larger than the capacitance of the primary side series resonant capacitor C2, and the smoothing capacitor Ci can be regarded as a short circuit in a high-frequency equivalent circuit, so that the same effect as in a case where the primary side series resonant capacitor C2 is grounded by the smoothing capacitor Ci is obtained.

Figure 11B:
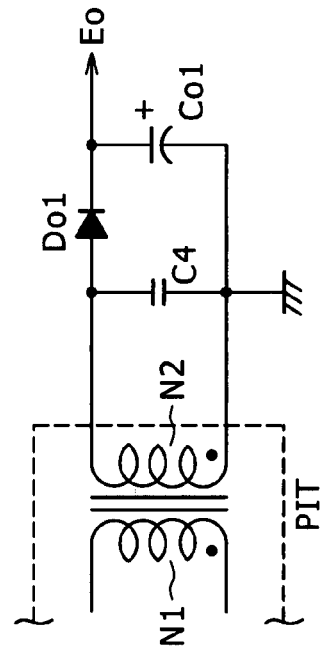
FIGS. 11A, 11B, and 11C are circuit diagrams of other secondary sides of the second embodiment.
Figure 11C:
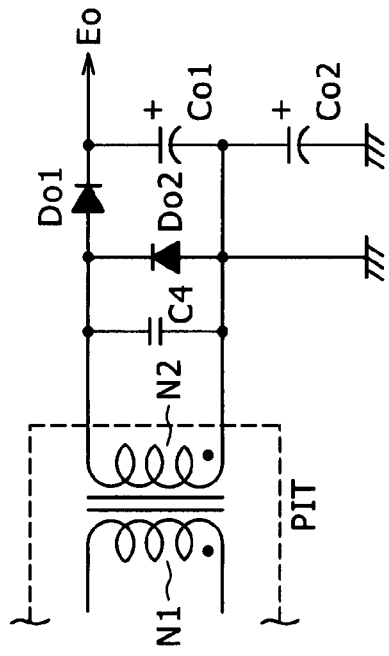
Figure 11A:
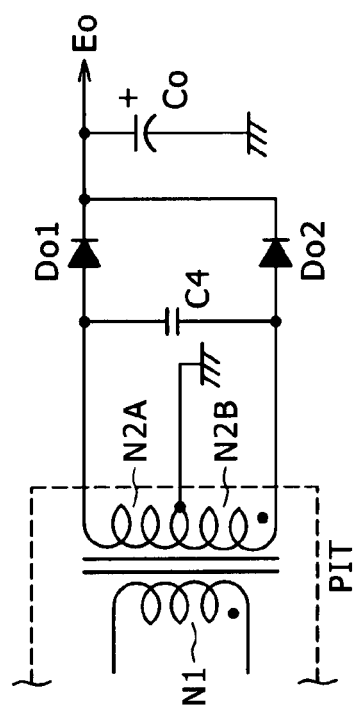

Next, FIGS. 11A, 11B, and 11C show typical examples of secondary side modified circuits in the second embodiment. The secondary side winding and the secondary side rectifying and smoothing circuit is not limited to the above-described embodiment. As shown in FIG. 11A, even with a double-wave rectifier circuit having a secondary side parallel resonant capacitor C4, the same effects as in the second embodiment can be obtained. In addition, as shown in FIG. 11B, even with a voltage doubler rectifier circuit having a secondary side parallel resonant capacitor C4, the same effects as in the second embodiment can be obtained. Further, as shown in FIG. 1C, even with a half-wave rectifier circuit having a secondary side parallel resonant capacitor C4, a class I switching circuit can provide the same effects as in the second embodiment.

Third Embodiment

Figure 12:
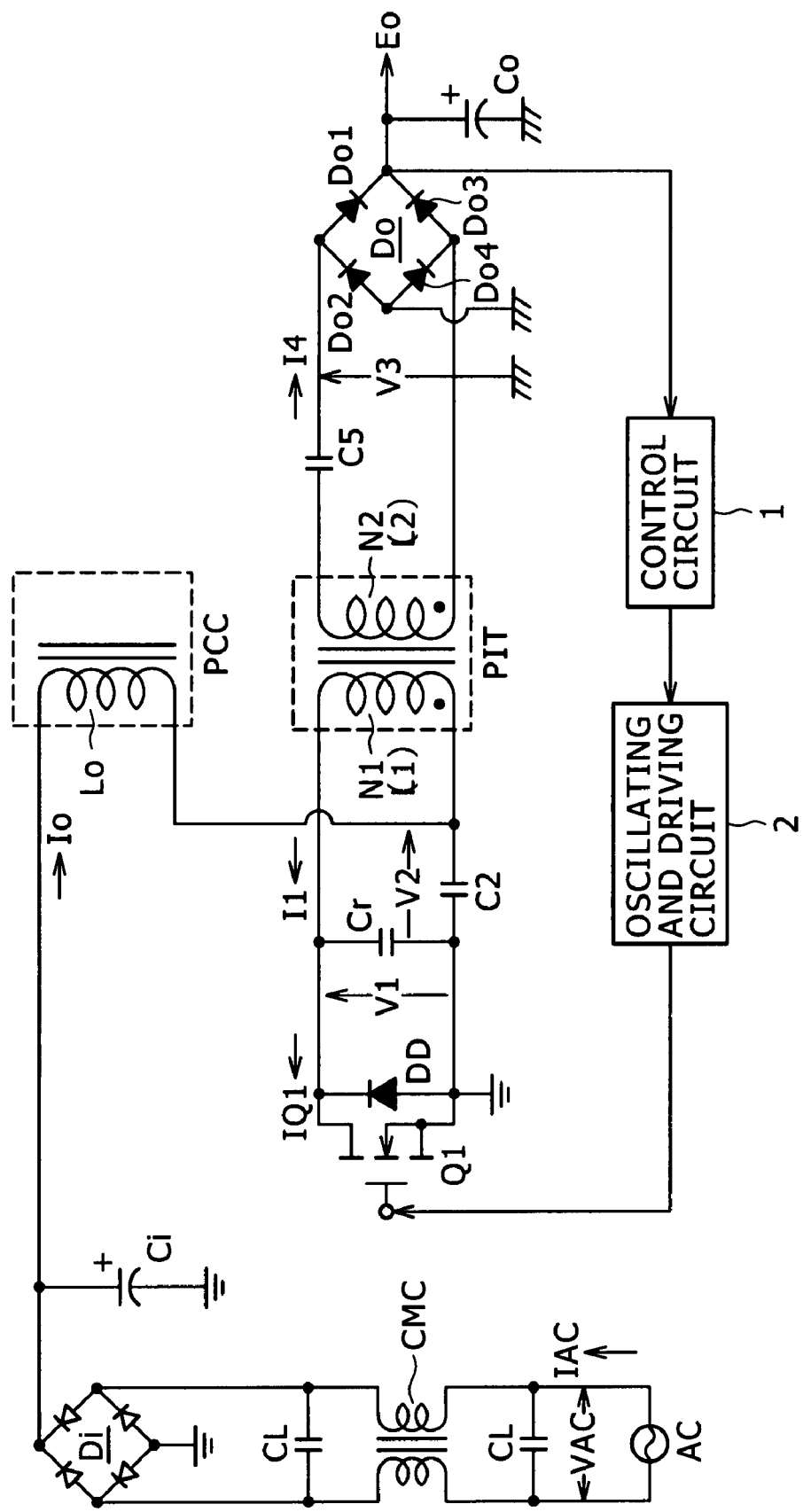
FIG. 12 is a circuit diagram showing an example of configuration of a power supply circuit according to a third embodiment.

FIG. 12 shows a switching power supply circuit according to a third embodiment. The same parts in this switching power supply circuit as in the switching power supply circuit according to the foregoing first embodiment or the switching power supply circuit according to the foregoing second embodiment are identified by the same reference numerals, and detailed description thereof will be omitted. The switching power supply circuit according to the third embodiment is different from the switching power supply circuit according to the first embodiment or the switching power supply circuit according to the second embodiment in that the switching power supply circuit according to the first embodiment does not have a resonant circuit or has a partial voltage resonant circuit on the secondary side, and the switching power supply circuit according to the second embodiment has a parallel resonant circuit on the secondary side, whereas the switching power supply circuit according to the third embodiment includes a secondary side series resonant circuit having a secondary side series resonant capacitor.

On a primary side, this switching power supply circuit has a primary side parallel resonant circuit whose resonance frequency is governed by the inductance Lo of a choke coil PCC, a leakage inductance L1 occurring at a primary winding N1, and a primary side parallel resonant capacitor Cr, and two current resonant circuit sets, that is, a primary side first series resonant circuit whose resonance frequency is governed by the inductance Lo and a primary side series resonant capacitor C2, and a primary side second series resonant circuit whose resonance frequency is governed by the leakage inductance L1 and the primary side series resonant capacitor C2. On a secondary side, the switching power supply circuit has a secondary side series resonant circuit formed by connecting a secondary side series resonant capacitor C5 to a secondary winding N2 and a full-wave bridge rectifier circuit having a secondary side rectifying element Do composed of diodes D1 to D4 and a smoothing capacitor Co for obtaining a secondary side direct-current output voltage Eo. The switching power supply circuit as a whole forms a multiple resonant converter.

A primary side first series resonance frequency as resonance frequency of the primary side first series resonant circuit is set to be substantially twice a primary side second series resonance frequency as resonance frequency of the primary side second series resonant circuit. A primary side parallel resonance frequency as resonance frequency of the primary side parallel resonant circuit is set to be substantially equal to or higher than 1.5 times the primary side first series resonance frequency. A resonance current is made to flow through the series resonant circuit on the secondary side.

Specifications of the switching power supply circuit according to the third embodiment in FIG. 12 and main concrete constants of parts in the switching power supply circuit according to the third embodiment are as follows. As for load power of the switching power supply circuit according to the third embodiment, a maximum load power Pomax=300 W, and a minimum load power Pomin=0 W. ZVS characteristics are maintained in this range. The value of an alternating input voltage VAC is 100 V. The value of the secondary side direct-current output voltage Eo is 175 V.

The value of the inductance of the choke coil PCC is 68 µH. A material for the core of a converter transformer PIT is an EER-35. A gap G of the core is set at 0.8 mm. The primary winding N1 is set to 40 T. The secondary winding N2 is set to 33 T. The coupling coefficient of the converter transformer is 0.82. The value of the primary side parallel resonant capacitor Cr of the primary side parallel resonant circuit is 4700 pF. The value of the primary side series resonant capacitor C2 is 0.1 µF. The value of the secondary side series resonant capacitor C5 is 0.15 µF. In the second embodiment having such constants, the value of primary side parallel resonance frequency $fo1p$ is 113 kHz, the value of primary side first series resonance frequency $fo11s$ is 59 kHz, the value of primary side second series resonance frequency $fo12s$ is 27 kHz, and the value of secondary side series resonance frequency $fo2s$ is 27 kHz, which is substantially equal to the primary side second series resonance frequency $fo12s$.

Figure 13:
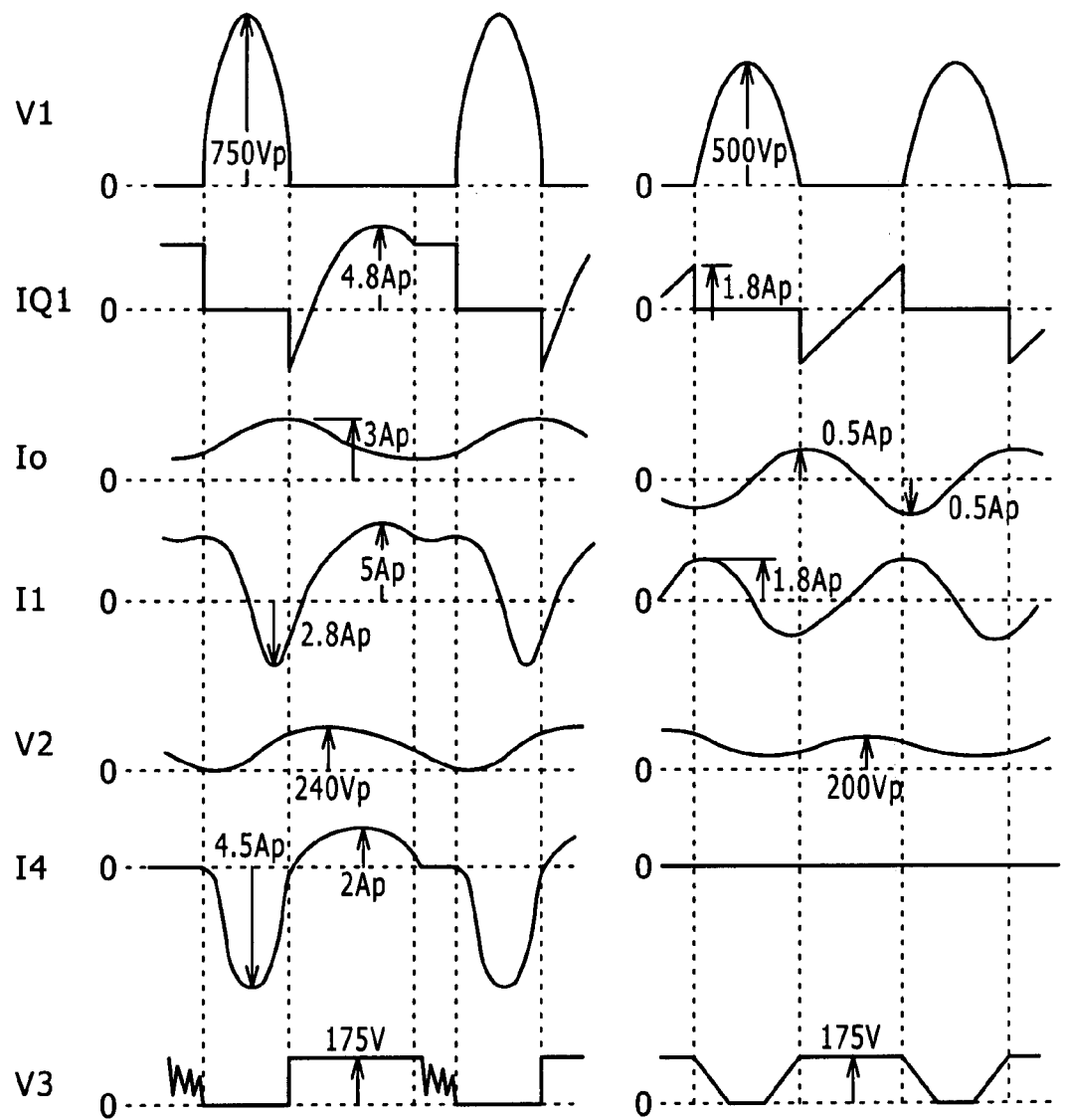
FIGS. 13A and 13B are waveform charts showing operations of principal parts in the power supply circuit according to the third embodiment on the basis of switching cycles.

Waveform charts of FIG. 13A and FIG. 13B are cited as results of experiment on the power supply circuit according to the third embodiment shown in FIG. 12. FIG. 13A shows a switching voltage V1, a switching current IQ1, a choke coil current Io, a primary winding current I1, a voltage V2 of the primary side series resonant capacitor, a secondary winding current I4, and a secondary side alternating voltage V3 under conditions of the maximum load power Pomax=300 W and the alternating input voltage VAC=100 V.

FIG. 13B shows the switching voltage V1, the switching current IQ1, the choke coil current Io, the primary winding current I1, the voltage V2 of the primary side series resonant capacitor (voltage across the primary side series resonant capacitor), the secondary winding current I4, and the secondary side alternating voltage V3 under conditions of the minimum load power Pomin=0 W and the alternating input voltage VAC=100 V.

Figure 14:
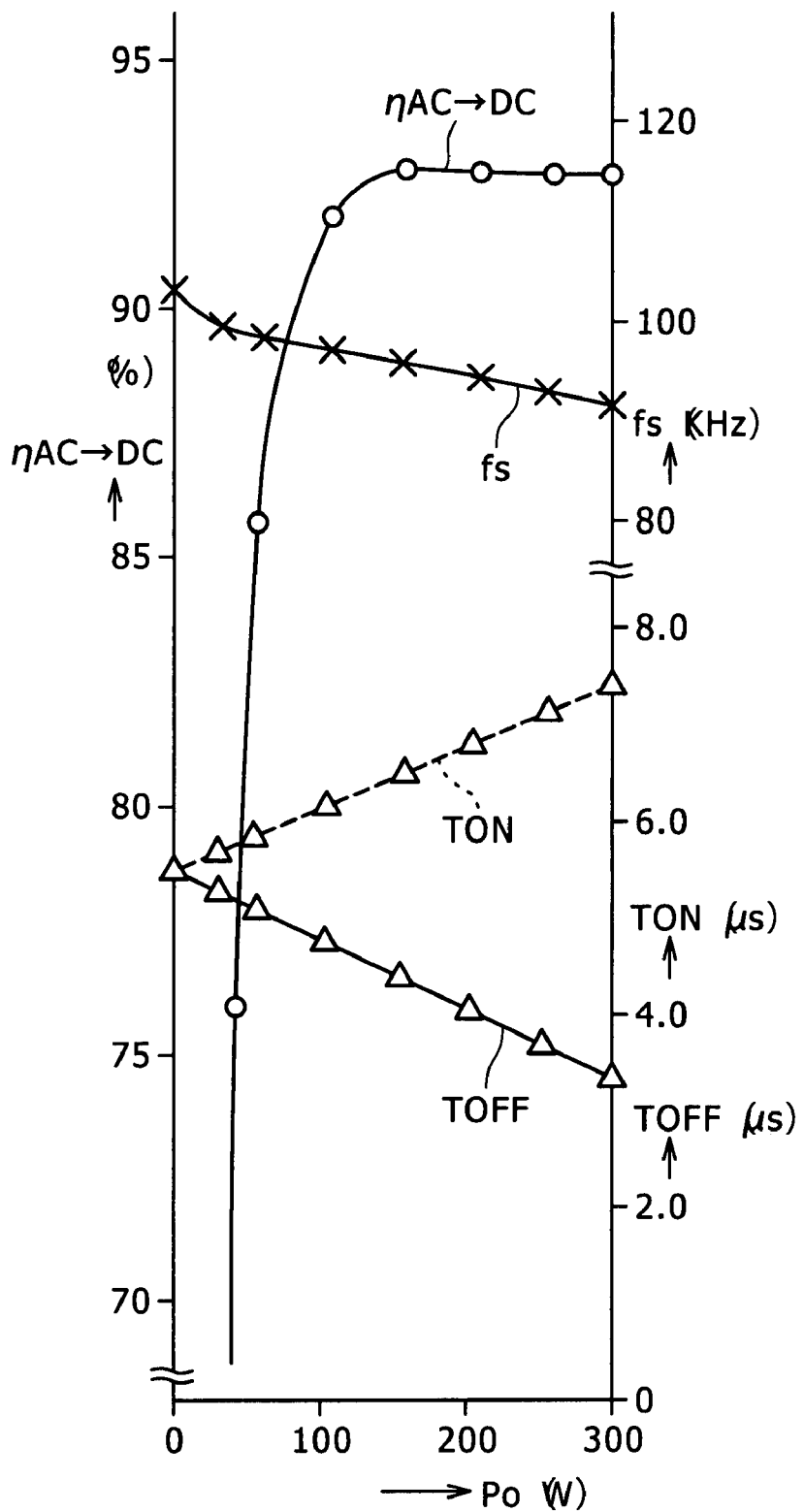
FIG. 14 is a diagram showing characteristics of variation of AC→DC power conversion efficiency and switching frequency with respect to load variation in the power supply circuit according to the third embodiment.

FIG. 14 shows switching frequency fs, efficiency of power conversion ($\eta$AC→DC) from the input to the output of the switching power supply circuit, a period TON, and a period TOFF with respect to load variation from the maximum load power Pomax=300 W to the minimum load power Pomin=0 w under an input condition of the alternating input voltage VAC=100 V in the switching power supply circuit according to the third embodiment.

A variable range $\Delta$fs necessary for the switching frequency fs for this load power variation is $\Delta$fs=8.1 kHz. Because such a narrow variable range $\Delta$fs suffices, excellent transient response characteristics when load power changes sharply are obtained.

It has also been confirmed that ZVS characteristics are obtained between the maximum load power Pomax=300 W and the minimum load power Pomin=0 W. In addition, because the choke coil PCC has a low inductance Lo of 68 $\mu$H, a loss in the choke coil PCC is small. Further, the value of the coupling coefficient of the converter transformer is 0.82, which is higher than the value in the past. These all lead to a result of an improvement in power conversion efficiency, and a high efficiency of 93.1% is obtained under the conditions of the alternating input voltage. VAC=100 V and the maximum load power Pomax=300 W. Incidentally, it has been confirmed that even when the value of the coupling coefficient of the converter transformer is set in a range of 0.8 to 0.85 as coupling coefficients higher than the value in the past, sufficient ZVS characteristics are exhibited.

Thus, according to the present embodiment employing the class I switching circuit and the secondary side series resonant circuit, the class I switching circuit having the same action and effect as in the first embodiment is used, error operation under medium load is eliminated, and proper ZVS operation is obtained. As for the secondary side, the secondary side series resonant circuit is used. Therefore, as is seen from relation between the secondary winding current I4 and the secondary side alternating voltage V3 in FIG. 13A, the diodes Do1 to Do4 have ZCS characteristics, and a conduction loss and a switching loss in the diodes Do1 to Do4 are reduced.

Examples of Modification of Third Embodiment

Figure 15:
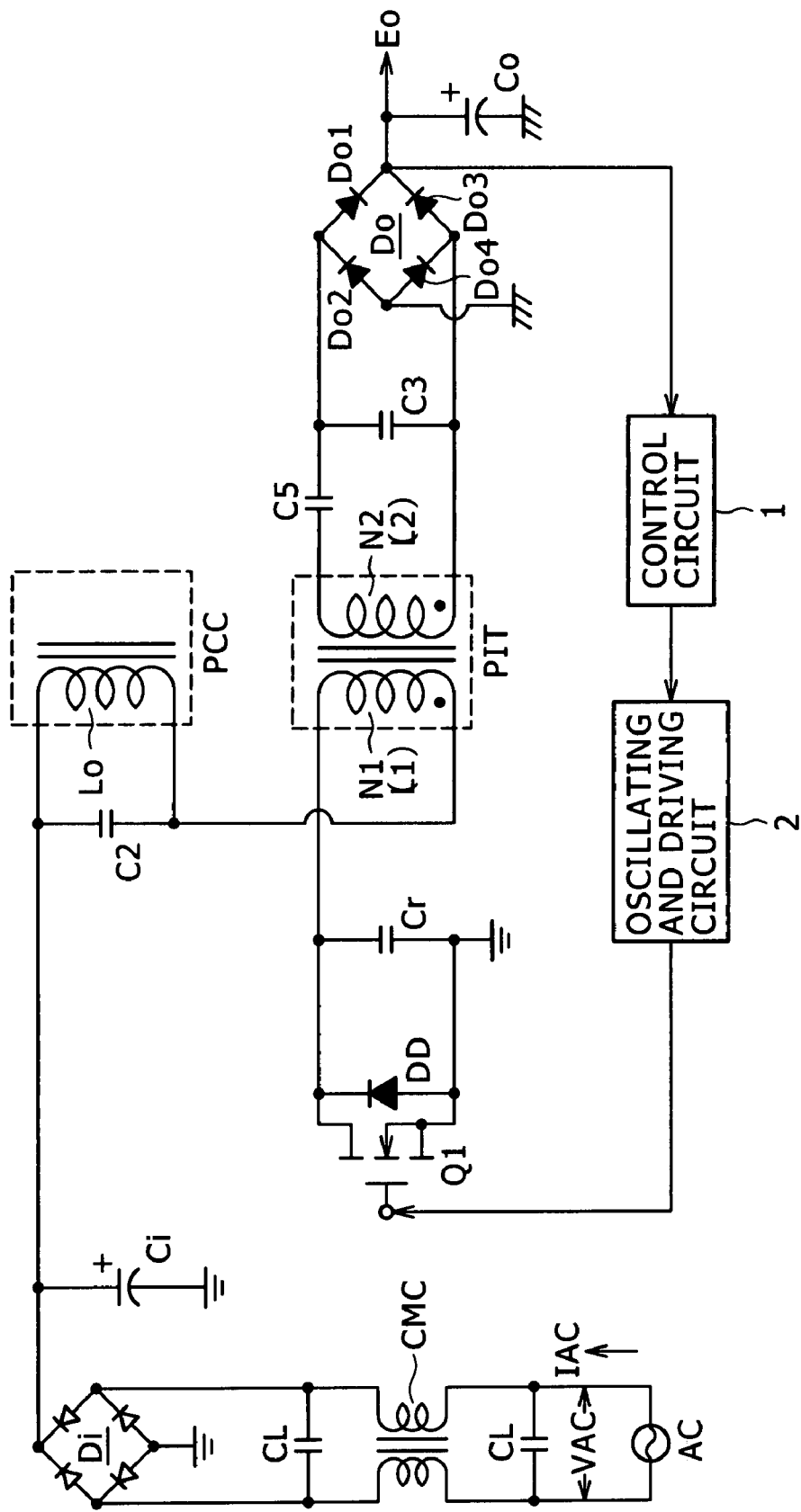
FIG. 15 is a circuit diagram showing an example of configuration of a power supply circuit according to an example of modification of the third embodiment.

While various modes are possible as examples of modification of the above-described third embodiment, typical examples will be illustrated in the following. First, FIG. 15 shows an example of modification of the class I switching circuit. In the third embodiment, the primary side series resonant capacitor C2 is grounded. However, as shown in FIG. 15, even when the primary side series resonant capacitor C2 is connected to the smoothing capacitor Ci, the same action and effect as in the third embodiment can be obtained. That is, the capacitance of the smoothing capacitor Ci is much larger than the capacitance of the primary side series resonant capacitor C2, and the smoothing capacitor Ci can be regarded as a short circuit in a high-frequency equivalent circuit, so that the same effect as in a case where the primary side series resonant capacitor C2 is grounded by the smoothing capacitor Ci is obtained. In addition, a secondary side partial voltage resonant circuit having a secondary side partial voltage resonant capacitor C3 provided on the secondary side as shown in FIG. 15 can further improve power conversion efficiency ($\eta$AC→DC) by 0.2 percentage points.

Figure 16B:
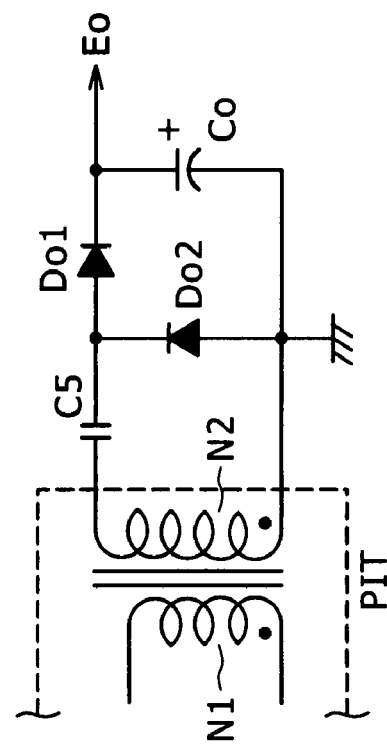
FIGS. 16A and 16B are circuit diagrams of other secondary sides of the third embodiment.
Figure 16A:
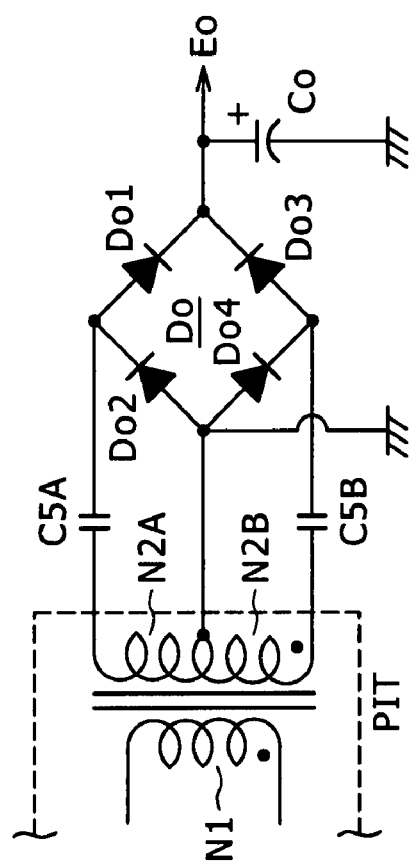

Next, FIGS. 16A and 16B show typical examples of secondary side modified circuits in the third embodiment. The secondary side winding and the secondary side rectifying and smoothing circuit is not limited to the above-described embodiment. As shown in FIG. 16A, even with a double-wave rectifier circuit having a secondary side series resonant capacitor C5A and a secondary side series resonant capacitor C5B, the operation of the class I switching circuit can provide the same effects as in the third embodiment. In addition, as shown in FIG. 16B, even with a voltage doubler rectifier circuit having a secondary side series resonant capacitor C5, the same effects as in the third embodiment can be obtained.

The embodiment of the present invention is not limited to the configurations shown as the respective embodiments described above. For example, it can be considered that an element other than the MOS-FET, such for example as an IGBT (Insulated Gate Bipolar Transistor) or a bipolar transistor, is selected as the switching element. In addition, while each of the above-described embodiments employs the externally excited switching converter, the embodiment of the present invention is applicable to cases where the switching converter is formed as a self-excited switching converter.

Fourth Embodiment

Figure 17:
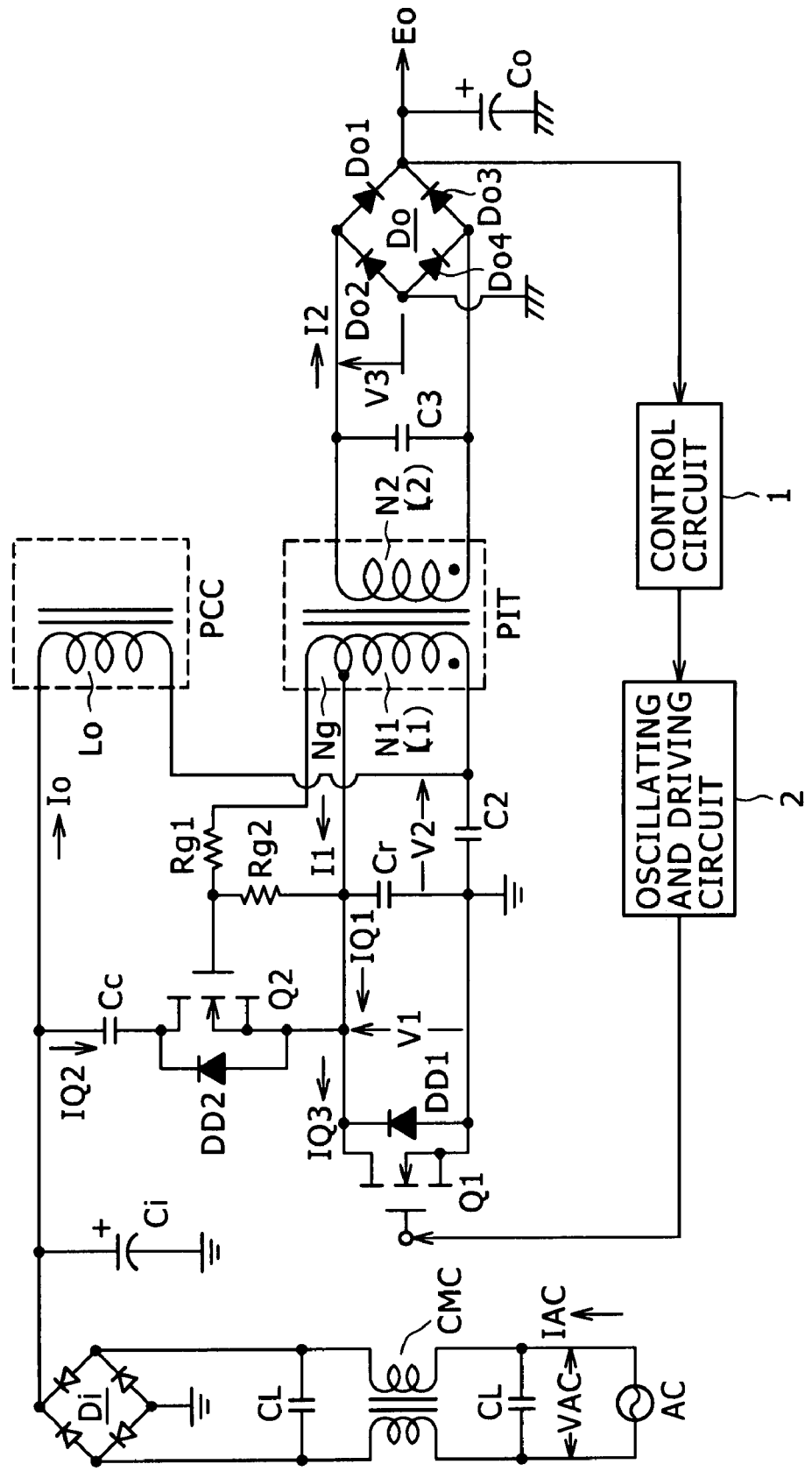
FIG. 17 is a circuit diagram showing an example of configuration of a power supply circuit according to a fourth embodiment.

FIG. 17 shows a switching power supply circuit according to a fourth embodiment. The same parts in this switching power supply circuit as in the switching power supply circuit according to the foregoing first embodiment are identified by the same reference numerals, and detailed description thereof will be omitted. On a primary side, this switching power supply circuit has a primary side parallel resonant circuit whose resonance frequency is governed by the inductance Lo of a choke coil PCC, a leakage inductance L1 occurring at a primary winding N1, a primary side parallel resonant capacitor Cr, and a voltage clamping capacitor Cc, and two current resonant circuit sets, that is, a primary side first series resonant circuit whose resonance frequency is governed by the inductance Lo and a primary side series resonant capacitor C2, and a primary side second series resonant circuit whose resonance frequency is governed by the leakage inductance L1 and the primary side series resonant capacitor C2.

In addition, an active clamping circuit is formed by a series circuit of the voltage clamping capacitor Cc and an auxiliary switching element Q2. In this case, the auxiliary switching element Q2 is turned on complementarily to a main switching element Q1. That is, the auxiliary switching element Q2 is not turned on while the main switching element Q1 is on (conducting), and the main switching element Q1 is not turned on while the auxiliary switching element Q2 is on.

In the following, the operation of a primary side resonant circuit will be described in more detail. According to switching operation performed by the main switching element Q1, voltage resonant operation of the primary side parallel resonant circuit makes a charging/discharging current flow through the primary side parallel resonant capacitor Cr and the voltage clamping capacitor Cc in an off period of the main switching element Q1. This charging/discharging current produces a resonance pulse voltage in the shape of substantially a half sinusoidal wave as a voltage across the main switching element Q1.

At this time, because the capacitance of the smoothing capacitor Ci is selected to be much larger than the capacitance of each of the primary side parallel resonant capacitor Cr and the voltage clamping capacitor Cc, the smoothing capacitor Ci can be equivalently regarded as a short circuit, and primary side parallel resonance frequency fo1p is practically determined by the values of the inductance Lo of the choke coil PCC, the leakage inductance L1, the primary side parallel resonant capacitor Cr, and the voltage clamping capacitor Cc. That is, the primary side parallel resonance frequency fo1p is governed by the values of the inductance Lo, the leakage inductance L1, the primary side parallel resonant capacitor Cr, and the voltage clamping capacitor Cc. In the fourth embodiment, the capacitance of the primary side parallel resonant capacitor Cr is 1500 pF, and the value of the voltage clamping capacitor Cc is 0.22 μF.

The active clamping circuit will be described. The active clamping circuit is formed by a series connection circuit of the voltage clamping capacitor Cc and the auxiliary switching element Q2. A MOS-FET having a body diode DD2 is used as the auxiliary switching element Q2. The gate of the MOS-FET is supplied with a voltage obtained by dividing a voltage from a control winding Ng by a resistance Rg1 and a resistance Rg2. The control winding Ng is wound in a converter transformer PIT in a direction such that the main switching element Q1 and the auxiliary switching element Q2 are complementarily turned on. In this case, the value of the resistance Rg1 is 220Ω (ohms), and the value of the resistance Rg2 is 100Ω (ohms). A voltage generated in the control winding Ng has a near-sinusoidal waveform. Therefore, by changing a ratio between the resistance Rg1 and the resistance Rg2, it is possible to adjust a voltage between the gate and the source of the auxiliary switching element Q2, and adjust the length of a time during which the voltage generated in the control winding Ng is clamped. In addition, the auxiliary switching element Q2 is controlled by the control winding Ng, and the voltage generated in the control winding Ng is controlled by the main switching element Q1. Thus the auxiliary switching element Q2 operates in synchronism with the main switching element Q1. Therefore a problem of for example occurrence of an undesired beat resulting from a plurality of switching frequencies being mixed does not occur.

The switching power supply circuit according to the fourth embodiment deals with load power of 300 W as maximum load power Pomax and load power of 0 W (no load) as minimum load power Pomin. The rated level of a secondary side direct-current output voltage Eo is 175 V. As for an alternating input voltage VAC, the switching power supply circuit can deal with a 100-V system.

Figure 18:
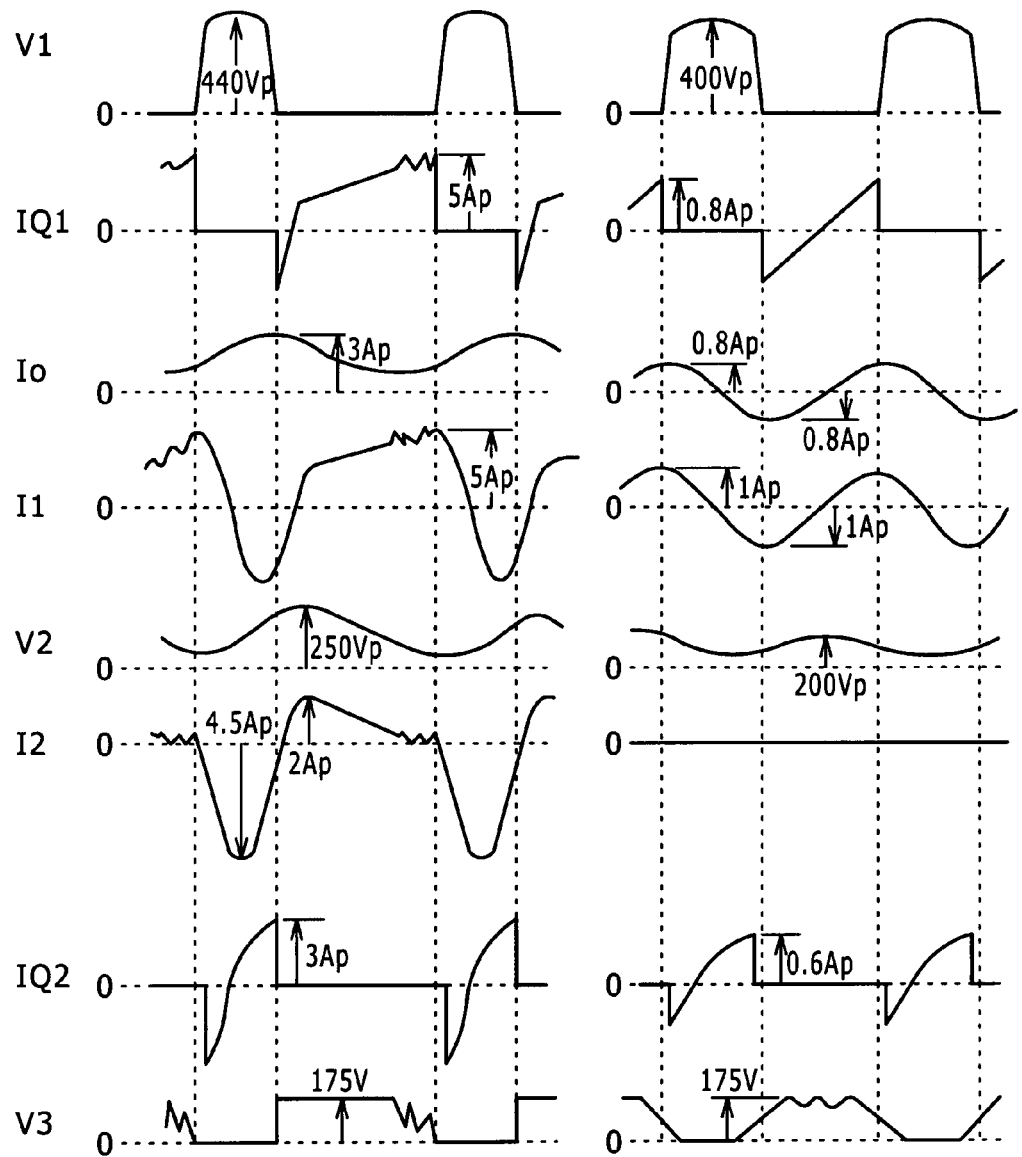
FIGS. 18A and 18B are waveform charts showing operations of principal parts in the power supply circuit according to the fourth embodiment on the basis of switching cycles.

Waveform charts of FIG. 18A and FIG. 18B are cited as results of experiment on the power supply circuit according to the fourth embodiment shown in FIG. 17. FIG. 18A shows a switching voltage V1, a switching current IQ1, a choke coil current Io, a primary winding current I1, a voltage V2 of the primary side series resonant capacitor, a secondary side rectifying element current I2, and a secondary side alternating voltage V3 under conditions of the maximum load power Pomax=300 W and the alternating input voltage VAC=100 V.

FIG. 18B shows the switching voltage V1 as voltage across the main switching element Q1, the switching current IQ1 as current flowing through the main switching element Q1, the choke coil current Io, the primary winding current I1, the voltage V2 across the primary side series resonant capacitor, the secondary side rectifying element current I2, an auxiliary switching current IQ2 as current flowing through the auxiliary switching element Q2, and the secondary side alternating voltage V3 under conditions of the minimum load power Pomin=0 W and the alternating input voltage VAC=100 V.

The waveform chart shown in FIG. 18A will be described in more detail. The switching voltage V1 is a drain-to-source voltage of the main switching element Q1 that is supplied with the direct-current input voltage Ei of the smoothing capacitor Ci and performs switching operation. One switching cycle includes a period TON in which the main switching element Q1 is to be turned on and a period TOFF in which the main switching element Q1 is to be turned off. The switching voltage V1 is at a zero level during the period TON, and has a resonant pulse waveform during the period TOFF. The voltage resonant pulse of the switching voltage V1 is obtained as a sinusoidal resonant waveform as a result of the resonant operation of the primary side parallel resonant circuit.

The switching current IQ1 flows from the drain side to the source side of the main switching element Q1, or flows through the body diode DD. The switching current IQ1 is at a zero level during the period TOFF. When turn-on timing is reached with the period TOFF ended and the period TON started, the switching current IQ1 first flows through the body diode DD, thus having a waveform of negative polarity, and is then inverted to flow from the drain to the source, thus having a waveform of positive polarity.

The choke coil current Io flows from the smoothing capacitor Ci into the switching circuit according to an embodiment of the present embodiment. The choke coil current Io is a pulsating current.

The primary winding current I1 flows through the primary winding N1 according to the switching operation of the main switching element Q1. The primary winding current I1 has a current waveform obtained by combining the switching current IQ1 and a current flowing through the primary side parallel resonant capacitor Cr with each other. The switching element Q1 performs on/off operation, whereby the resonant pulse voltage as the switching voltage V1 during the period TOFF is applied to the primary side first series resonant circuit and the primary side second series resonant circuit. Thereby the primary side first series resonant circuit and the primary side second series resonant circuit perform resonant operation, and the primary winding current I1 forms a near-sinusoidal alternating waveform according to the switching cycle.

The voltage V2 of the primary side series resonant capacitor is generated by a combined current of currents flowing through the primary side first series resonant circuit and the primary side second series resonant circuit, and is a voltage obtained by adding together the substantially sinusoidal waveforms of the respective currents.

The secondary side rectifying element current I2 flows into the secondary side rectifying element Do, and is zero at a voltage polarity change point. This is an effect of the partial voltage resonant circuit. A favorable effect of improving efficiency is obtained when the value of the secondary side partial voltage resonant capacitor C3 is in a range of 330 pF to 1000 pF. The addition of the parallel resonant circuit improves power conversion efficiency ($\eta AC \rightarrow DC$) to be described later by about 0.2 percentage points as compared with a case where the parallel resonant circuit is not added.

The auxiliary switching current IQ2 flows when the auxiliary switching element Q2 is on. The auxiliary switching element Q2 is turned on shortly after the main switching element Q1 is turned off, and the auxiliary switching element Q2 is turned off shortly before the main switching element Q1 is turned on. A time during which the auxiliary switching element Q2 is on is determined by the ratio between the resistance Rg1 and the resistance Rg2, as described above. As the value of the resistance Rg1 is decreased as compared with the value of the resistance Rg2, the time during which the auxiliary switching element Q2 is on is lengthened.

The capacitance of the voltage clamping capacitor Cc is sufficiently large so that a voltage across the voltage clamping capacitor Cc is scarcely changed by an amount of charge of the auxiliary switching current IQ2. Thus, while the auxiliary switching element Q2 is on, that is, while the auxiliary switching current IQ2 is flowing, the voltage V1 applied to the main switching element Q1 is clamped. Therefore, as shown by the waveform of the voltage V1, the peak part of the voltage V1 which peak part should inherently form a sinusoidal wave shape is flattened. Then, the withstand voltage of the main switching element Q1 can be made low.

Further, it has been confirmed by experiment that a range where ZVS characteristics are exhibited is expanded by passing the auxiliary switching current IQ2. That is, the active clamping circuit can widen the range of ZVS characteristics.

The secondary side alternating voltage V3 is a voltage between a connected circuit of the secondary winding N2 and the secondary side partial voltage resonant capacitor C3 and a secondary side ground point. The secondary side alternating voltage V3 is input to the secondary side rectifying element Do. In each period of a half cycle of the secondary side alternating voltage V3, a forward-direction voltage is applied to diodes Do1 and Do4, and accordingly the diodes Do1 and Do4 conduct. Thereby the secondary side alternating voltage V3 is smoothed as secondary side direct-current output voltage Eo in a secondary side smoothing capacitor Co. In each period of another half cycle of the secondary side alternating voltage V3, a forward-direction voltage is applied to diodes Do2 and Do3, and accordingly the diodes Do2 and Do3 conduct. Thereby the secondary side alternating voltage V3 is smoothed as secondary side direct-current output voltage Eo in the secondary side smoothing capacitor Co.

Figure 19:
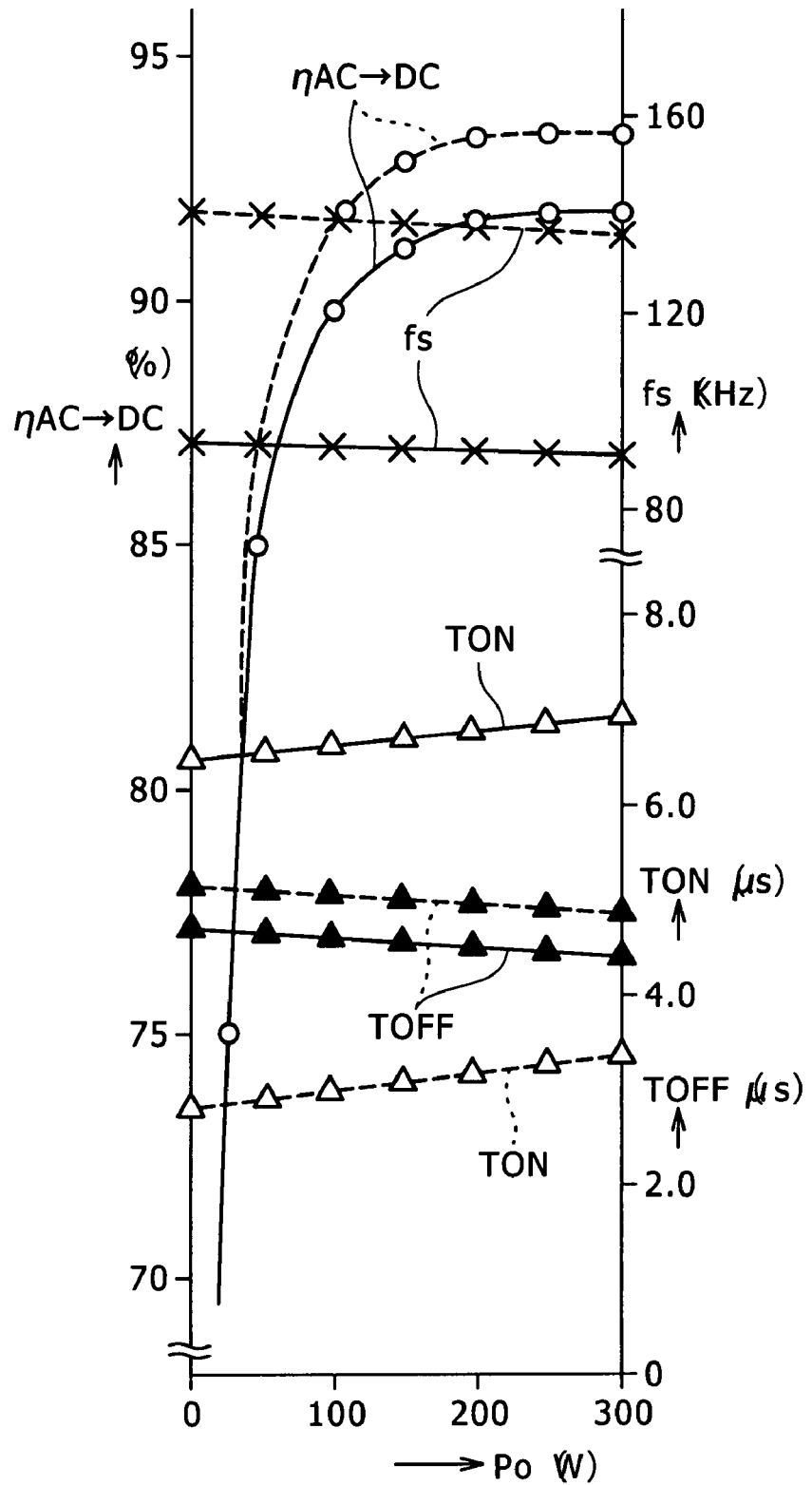
FIG. 19 is a diagram showing characteristics of variation of AC→DC power conversion efficiency and switching frequency with respect to load variation in the power supply circuit according to the fourth embodiment.

FIG. 19 shows switching frequency fs, efficiency of power conversion ($\eta AC \rightarrow DC$) from the input to the output of the switching power supply circuit, the period TON, and the period TOFF with respect to load variation from the maximum load power Pomax=300 W to the minimum load power Pomin=0 W under an input condition of the alternating input voltage VAC=100 V in the switching power supply circuit according to the fourth embodiment. Solid lines represent a case where the alternating input voltage VAC is 100 V. Broken lines represent a case where the alternating input voltage VAC is 230 V.

The switching frequency fs corresponding to the load variation is 90.9 kHz to 92.4 kHz in the case of the alternating input voltage VAC is 100 V and load power is in a range of 300 W as maximum load power Pomax to 0 W as minimum load power Pomin. It therefore suffices to have a very narrow variable range $\Delta fs=1.5$ kHz. In the case of the alternating input voltage VAC is 230 V and load power is in a range of 300 W as maximum load power Pomax to 0 W as minimum load power Pomin, the switching frequency fs is 125 kHz to 128.2 kHz. It therefore suffices to have a very narrow variable range $\Delta fs=3.2$ kHz. Further, excellent characteristics are obtained even when the alternating input voltage VAC is in a range of 85 V to 288 V. This results from the active clamping circuit widening the range of ZVS characteristics. As a result, excellent transient response characteristics when load power changes sharply are obtained.

Incidentally, in each of the first embodiment, the second embodiment, the third embodiment, and the fourth embodiment described above, the primary side rectifying element Di and the smoothing capacitor Ci are provided on the primary side, and power input to the primary side is alternating-current power. However, in each of the embodiments, when the power input to the primary side is direct-current power, the action and effect of each principal part in the switching power supply circuit according to the present embodiment do not particularly differ except that two of the four diodes of the primary side rectifying element Di conduct according to the polarity of the input direct-current power. Further, when the primary side rectifying element Di is not provided, the value of the smoothing capacitor Ci is made lower, and direct-current power is supplied as input power, the action and effect of each principal part in the switching power supply circuit according to the present embodiment do not particularly differ except that the input power is alternating-current power or direct-current power.

Examples of Modification of Fourth Embodiment

Figure 20:
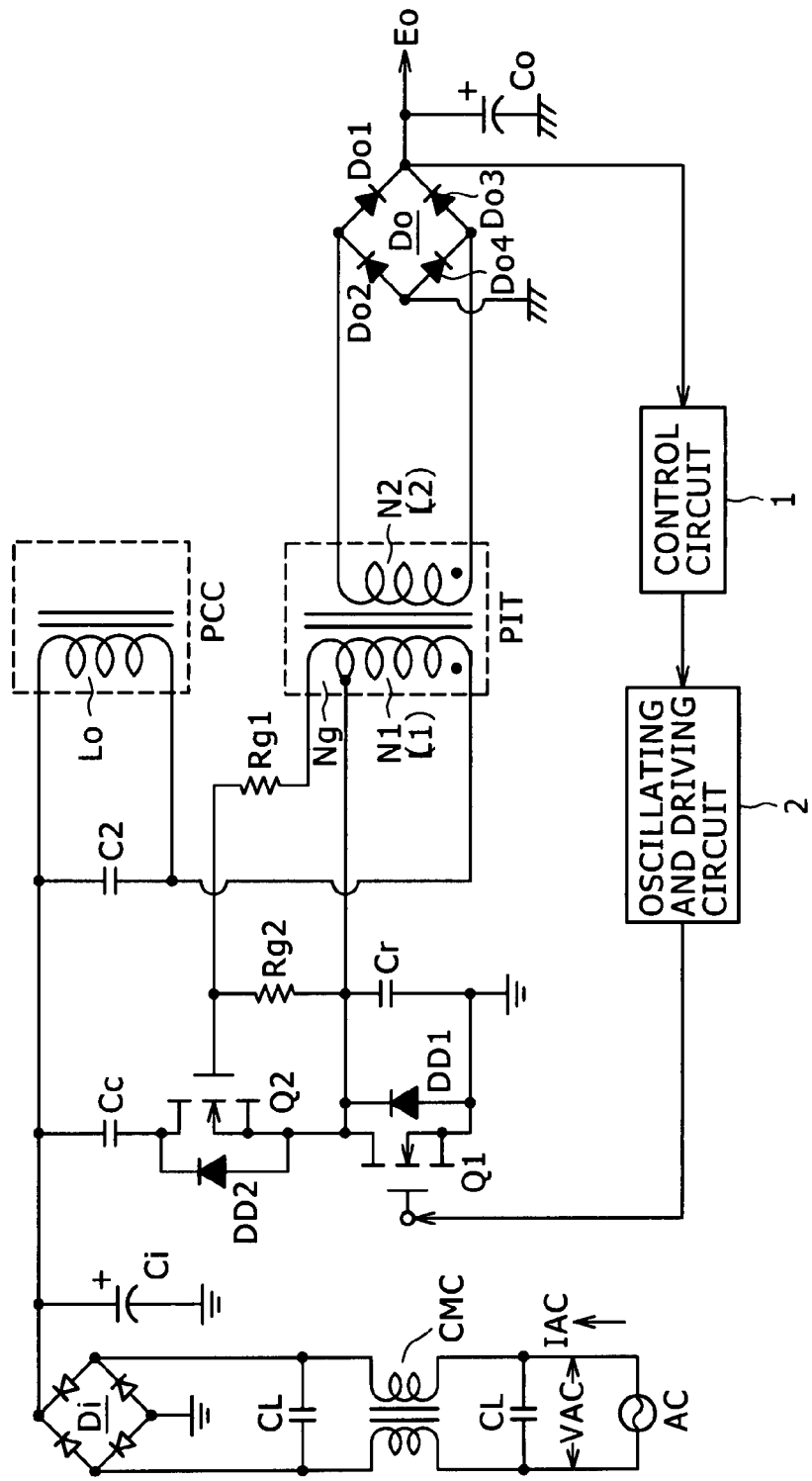
FIG. 20 is a circuit diagram showing an example of configuration of a power supply circuit according to an example of modification of the fourth embodiment.

While various modes are possible as examples of modification of the above-described fourth embodiment, typical examples will be illustrated in the following. First, FIG. 20 shows an example of modification of the switching circuit according to the fourth embodiment. In the fourth embodiment, the primary side series resonant capacitor C2 is grounded. However, as shown in FIG. 20, even when the primary side series resonant capacitor C2 is connected to the smoothing capacitor Ci, the same action and effect as in the fourth embodiment can be obtained. That is, the capacitance of the smoothing capacitor Ci is much larger than the capacitance of the primary side series resonant capacitor C2, and the smoothing capacitor Ci can be regarded as a short circuit in a high-frequency equivalent circuit, so that the same effect as in a case where the primary side series resonant capacitor C2 is grounded by the smoothing capacitor Ci is obtained.

Figure 21B:
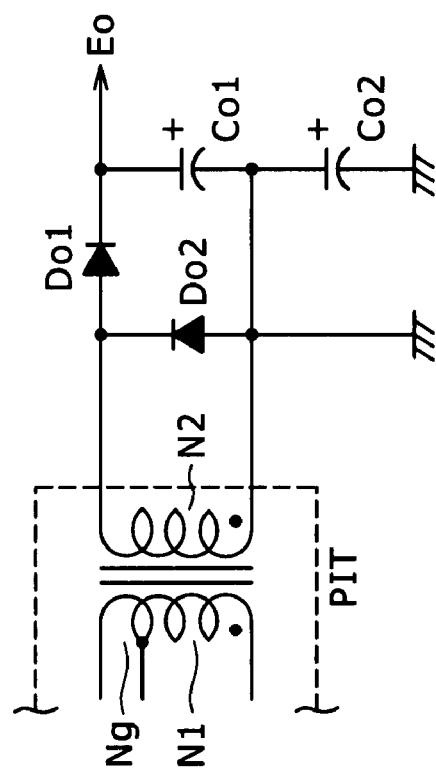
FIGS. 21A and 21B are circuit diagrams of other secondary sides of the fourth embodiment.
Figure 21A:
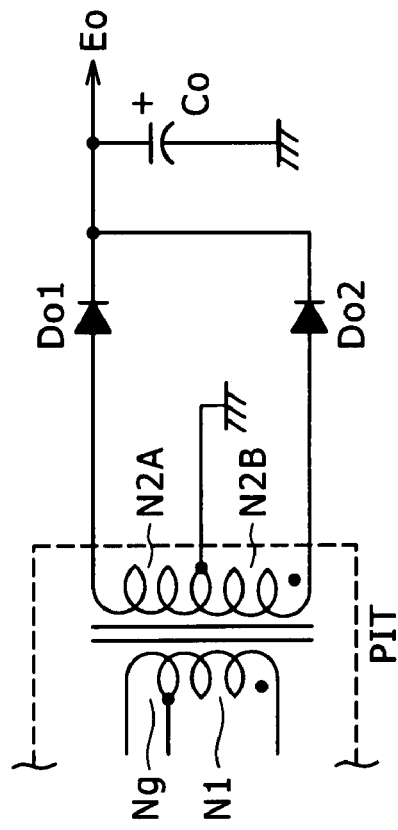

Next, FIGS. 21A and 21B show typical examples of secondary side modified circuits in the fourth embodiment. The secondary side winding and the secondary side rectifying and smoothing circuit are not limited to the above-described embodiment. Even with a double-wave rectifier circuit shown in FIG. 21A, the same effects as in the above embodiment can be obtained. In addition, even with a voltage doubler rectifier circuit shown in FIG. 21B, the same effects as in the above embodiment can be obtained. In these cases, there is no partial voltage resonant circuit, and therefore power conversion efficiency is decreased by about 0.2 percentage points as compared with a case where the partial voltage resonant circuit is provided.

It should be understood by those skilled in the art that various modifications, combinations, sub-combinations and alternations may occur depending on design requirements and other factors insofar as they are within the scope of the appended claims or the equivalent thereof.

The invention claimed is:

1. A switching power supply circuit for converting primary side direct-current voltage to secondary side direct-current voltage, said switching power supply circuit comprising:
   a choke coil supplied with said primary side direct-current voltage;
   a converter transformer having a primary winding on a primary side, the primary winding being connected to said choke coil, and a secondary winding on a secondary side;
   a switching element for switching said primary side direct-current voltage supplied via said choke coil and the primary winding of said converter transformer;
   a primary side series resonant capacitor having one terminal connected to a point of connection between said choke coil and said primary winding, the primary side series resonant capacitor forming a primary side first series resonant circuit with an inductance of said choke coil and forming a primary side second series resonant circuit with a leakage inductance occurring at said primary winding;
   a primary side parallel resonant capacitor connected in parallel with said switching element, the primary side parallel resonant capacitor forming a primary side parallel resonant circuit with the inductance of said choke coil and the leakage inductance occurring at said primary winding;
   an oscillating and driving circuit for on-off driving of said switching element;
   a secondary side rectifier circuit for generating said secondary side direct-current voltage, the secondary side rectifier circuit being connected to the secondary winding of said converter transformer, a switching output of said switching element being transmitted to the secondary winding of the converter transformer; and
   a control circuit for supplying a control signal to make a value of said secondary side direct-current voltage output by said secondary side rectifier circuit a predetermined value to said oscillating and driving circuit;
   wherein resonance frequency of said primary side first series resonant circuit is set at a frequency substantially twice resonance frequency of said primary side second series resonant circuit, and
   resonance frequency of said primary side parallel resonant circuit is set at a frequency substantially equal to or higher than 1.5 times the resonance frequency of said primary side first series resonant circuit.

2. The switching power supply circuit as claimed in claim 1, further comprising an active clamping circuit for clamping a voltage applied to said switching element, the active clamping circuit being connected in parallel with a series circuit of said choke coil and the primary winding of said converter transformer, the active clamping circuit being formed by connecting an auxiliary switching element, which is turned on complementarily to said switching element, and a voltage clamping capacitor in series with each other.

3. The switching power supply circuit as claimed in claim 1, wherein the secondary side rectifier circuit connected to the secondary winding of said converter transformer has one of a partial voltage resonant capacitor and a parallel resonant capacitor connected in parallel with said secondary winding, the partial voltage resonant capacitor and the parallel resonant capacitor forming a partial voltage resonant circuit and a voltage resonant circuit respectively, together with a leakage inductance occurring at said secondary winding.

4. The switching power supply circuit as claimed in claim 1, wherein the secondary side rectifier circuit connected to said secondary winding of said converter transformer has a secondary side series resonant capacitor connected in series with said secondary winding, a leakage inductance occurring at said secondary winding and said secondary side series resonant capacitor forming a secondary side series resonant circuit.

5. The switching power supply circuit as claimed in claim 1, wherein another terminal, which is supplied with said primary side direct-current voltage, of said primary side series resonant capacitor is connected to one terminal of said choke coil.

6. The switching power supply circuit as claimed in claim 1, wherein said converter transformer has a core, and said primary winding and said secondary winding are wound around the core so as to be divided from each other, whereby said primary side and said secondary side are insulated from each other in terms of direct current.

7. The switching power supply circuit as claimed in claim 6, wherein loose coupling between said primary winding and said secondary winding is obtained by an interval of a gap provided in said core.

8. The switching power supply circuit as claimed in claim 7, wherein said core is an EE-shaped core formed by combining two pieces of ferrite material having E-shaped magnetic legs with each other such that the magnetic legs are opposed to each other, and
   said gap is formed in a central magnetic leg of said core, and said primary winding and said secondary winding are wound around the central magnetic leg of said core so as to be divided from each other via a bobbin.

9. The switching power supply circuit as claimed in claim 1, wherein said primary side direct-current voltage is supplied from a rectifying and smoothing circuit having a rectifying element for rectifying an alternating input voltage and a smoothing capacitor for smoothing a rectified output from the rectifying element.

* * * * *